US007379961B2

(12) United States Patent
Matsuoka

(10) Patent No.: US 7,379,961 B2
(45) Date of Patent: May 27, 2008

(54) SPATIALIZED AUDIO IN A THREE-DIMENSIONAL COMPUTER-BASED SCENE

(75) Inventor: Shinya Matsuoka, Mountain View, CA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 08/841,397

(22) Filed: Apr. 30, 1997

(65) Prior Publication Data

US 2002/0013813 A1    Jan. 31, 2002

(51) Int. Cl.
*G06F 15/16* (2006.01)
(52) U.S. Cl. .................. 709/203; 709/224; 709/227; 348/14; 370/62
(58) Field of Classification Search ............... 379/202, 379/203, 204, 88.13, 88.19, 88.25; 348/15, 348/14; 370/467, 62; 709/500, 229, 224, 709/203, 227, 219, 220; 700/266, 94; 395/709
See application file for complete search history.

(56) References Cited

U.S. PATENT DOCUMENTS

| | | | | |
|---|---|---|---|---|
| 4,360,827 A | * | 11/1982 | Braun | 348/15 |
| 4,691,347 A | * | 9/1987 | Stanley | 379/203 |
| 5,408,526 A | * | 4/1995 | McFarland | 379/202 |
| 5,490,247 A | * | 2/1996 | Tung | 345/501 |
| 5,550,924 A | * | 8/1996 | Helf | 381/94.3 |
| 5,559,875 A | * | 9/1996 | Bieselin | 379/202 |
| 5,710,591 A | * | 1/1998 | Bruno | 348/15 |
| 5,764,750 A | * | 6/1998 | Chau et al. | 379/229 |
| 5,864,816 A | * | 1/1999 | Everett | 704/500 |
| 2003/0028287 A1 | * | 2/2003 | Puskas | 700/266 |
| 2003/0045956 A1 | * | 3/2003 | Comair et al. | 700/94 |

OTHER PUBLICATIONS

Cohen et al, Virtual gain for windows, Human interface lab, Japan, 85-91, Oct. 1993.*
Luwig et al, Extending the notion of a window system to audio, Computer, 66-72, Aug. 1990.*

(Continued)

*Primary Examiner*—Khanh Dinh
(74) *Attorney, Agent, or Firm*—Baker Botts L.L.P.

(57) ABSTRACT

A system and method for enabling an audio conference server (ACS) to provide an application program with multi-point weight controllable audio conferencing. The ACS manages a plurality of audio conferences, receives audio data from a plurality of audio clients, mixes the audio data to provide distance-based attenuation according to decay characteristics for each sound, and delivers the mixed audio data to a plurality of audio clients. Audio clients include set-top box (STB) audio clients and point source audio (PSA) audio clients. The ACS mixes the audio data by identifying a decay factor. Pre-defined decay factors include an audio big decay factor, an audio small decay factor, an audio medium decay factor, and a constant decay factor. One can also develop a customized decay factor. A weighted value for a source audio client based on the identified decay factor and the distance between the source audio client and a target audio client is determined. A mix table is generated using the weighted values for each source/target audio client pair. Then an actual mix value for each target audio client is calculated using the mix table. The present invention also includes means for refining the actual mix value.

28 Claims, 18 Drawing Sheets

OTHER PUBLICATIONS

Cohen et al, Multidimensional audio window management, International Journal Studies, 319-336, 1991.*

Cohen et al, Augmented audio reality: telepresence/VR hybrid, IEE 1993, 361-364, Oct. 1993.*

Microsoft NetMeeting 2.1 Resource Kit, pp. i-xiii; 1-12; 105-111 (1996-1997) <http://www.microsoft.com/netmeeting/reskit/>.

CoolTalk Product Communicator (1997) <http://search.netscape.com/comprod/products/navigator/version_3.0/communication/cooltalk/index.html>.

CoolTalk Productor Information (1996) <http://search.netscape.com/eng/mozilla/3.0relnotes/cooltalk/index.html>.

CoolTalk Features (1996) <http://search.netscape.com/eng/mozilla/3.0/relnotes/CoolTalk/CoolTalk-screenshots.html>.

About Netscape Conference, pp. 1-23 (visited Dec. 2, 1997) <file:///CL/ProgramFiles/Netscape/Commun...ogram/NetHelp/netscape/confernc/conf.html>.

VoxPhone Features (1997) <http://www.voxware.com>.

Voxware Conferencing Platform (1997) <http://www.voxware.com>.

On-Live! Technologies, "SDK Programmer's Guide", (Dec. 1996) pp. 1-18.

* cited by examiner

ACPROXY CLASS METHODS — 1100

| METHOD | DESCRIPTION |
|---|---|
| ACPROXY() | OPENS THE AUDIO CONFERENCE. |
| ~ACPROXY() | CLEANS UP AND CLOSES THE AUDIO CONFERENCE. |
| ADDCLIENT() | ADDS SET TOP AUDIO CLIENT TO THE AUDIO CONFERENCE. |
| ADDPSA() | ADDS A PSA AUDIO CLIENT TO THE CONFERENCE. |
| AUDIOS() | LISTS AUDIO CLIENT IDS IN THE CONFERENCE |
| DEMUTEAUDIO() | ENABLES AUDIO OF THE PSA. |
| GETAUDIOLOCATION() | LOCATES X, Y COORDINATES OF AN AUDIO CLIENT. |
| GETCONFINFO() | RETRIEVES AUDIO CONFERENCE INFORMATION. |
| MOVEAUDIO() | MOVES AUDIO SOURCE TO A SPECIFIED LOCATION. |
| MUTEAUDIO() | DISABLES AUDIO OF THE PSA. |
| REGISTEROWNER() | TRANSFER OWNER OF THE AUDIO CONFERENCE USING THE OBJECT REFERENCE. |
| REGISTEROWNERBYNAME() | TRANSFER OWNER OF THE AUDIO CONFERENCE USING THE NAME OF THE APPLICATION AS EXPORTED BY THE NAME SPACE. |
| REMOVEAUDIO() | REMOVES THE AUDIO CLIENT. |
| UNREGISTEROWNER() | REMOVES PREVIOUS OWNERSHIP OF THE AUDIO CONFERENCE. |

1102 — ACPROXY()
1104 — ~ACPROXY()
1106 — ADDCLIENT()
1108 — ADDPSA()
1110 — AUDIOS()
1112 — DEMUTEAUDIO()
1114 — GETAUDIOLOCATION()
1116 — GETCONFINFO()
1118 — MOVEAUDIO()
1120 — MUTEAUDIO()
1122 — REGISTEROWNER()
1124 — REGISTEROWNERBYNAME()
1126 — REMOVEAUDIO()
1128 — UNREGISTEROWNER()

FIG. 11

POINTSOURCEAUDIO CLASS METHODS ~1200

| METHOD | DESCRIPTION |
|---|---|
| POINTSOURCEAUDIO() | CLASS CONSTRUCTOR. INSTANTIATES A PSA OBJECT. |
| ~POINTSOURCEAUDIO() | CLEANS UP RESOURCES, CLOSES THE DEVICE USED BY A PSA. |
| PLAY() | PLAYS THE AUDIO SOURCE. |
| STOP() | STOPS PLAYING THE AUDIO SOURCE. |
| PAUSE() | PAUSES THE PLAYING OF THE AUDIO SOURCE. |
| RESUME() | RESUMES PLAYING THE AUDIO SOURCE. |

THE ACS :: AUDIO CONFERENCE SERVICE METHODS — 1300

| METHOD | DISCRIPTION |
|---|---|
| OPENCONFERENCE() | CREATES AN AUDIO CONFERENCE. |
| CLOSECONFERENCE() | CLOSES AN AUDIO CONFERENCE. |
| GETCONFERENCEBYTICKET() | FINDS THE CONFERENCE NAME GIVEN THE TICKET NUMBER. |
| LISTCONFERENCE() | RETURNS A SEQUENCE OF CONFERENCE OBJECTS. |
| HCTAUDIOSTAT() | FINDS INFORMATION ABOUT A SET - TOP AUDIO CLIENT. |

THE ACS :: AUDIO CONFERENCE METHODS

| METHOD | DESCRIPTION |
|---|---|
| NEWAUDIO() | CREATES AN AUDIO CLIENT FOR A GIVEN SET-TOP BOX. |
| DELETEAUDIO() | DELETES AN AUDIO CLIENT. |
| REGISTEROWNER() | REGISTERS CONFERENCE OWNER BY OBJECT REFERENCE. |
| REGISTEROWNERBYNAME() | REGISTERS CONFERENCE OWNER BY EXPORT NAME. |
| UNREGISTEREOWNER() | REMOVES A REGISTERED CONFRENCE OWNER. |
| SETMIXONE() | SETS THE VOLUME OF THE CONVERSATION BETWEEN TWO AUDIO CLIENTS. |
| SETMIX() | SETS THE VOLUME OF THE CONVERSATION BETWEEN MANY AUDIO CLIENT PAIRS. |
| GETMIXONE() | RETURNS THE VOLUME SETTING BETWEEN TWO AUDIO CLIENT PAIRS. |
| GETMIX() | RETURNS THE VOLUME SETTINGS BETWEEN MANY AUDIO CLIENT PAIRS. |
| SETTIMEOUT() | SETS A NUMBER OF SECONDS OF INACTIVITY, AFTER WHICH THE CONFERENCE IS CLOSED AUTOMATICALLY. IT CAN BE SET TO NEVER CLOSE. |
| GETTIMEOUT() | FINDS THE LENGTH IN SECONDS OF THE TIMEOUT. |
| AUDIOIDS() | GETS A LIST OF AUDIO IDs IN A CONFERENCE. |
| AUDIOSTAT() | GETS INFORMATION ABOUT AN AUDIO CLIENT GIVEN THE AUDIO ID. |
| CONFSTAT() | GETS INFORMATION ABOUT AN AUDIO CONFERENCE. |
| HCTAUDIOSTAT() | GETS INFORMATION ABOUT AN AUDIO CLIENT GIVEN THE SET-TOP ID. |
| PING() | PINGS A GIVEN AUDIO CONFERENCE AND RETURNS AN EXCEPTION IF THE CONFERENCE DOESN'T EXIST. |

FIG. 14

SPATIALIZED AUDIO IN A THREE-DIMENSIONAL COMPUTER-BASED SCENE

BACKGROUND OF THE INVENTION

1. Field of the Invention

The present invention relates generally to audio conferencing, and more particularly to spatial audio in a computer-based scene.

2. Related Art

An audio conference consists of an environment shared by viewers using the same application over an interactive TV network. In a typical application, viewers move graphic representations (sometimes referred to as personas or avatars) on the screen interactively using a remote control or game pad. Viewers use their set-top microphones and TV speakers to talk and listen to other viewers and to hear sounds that are intended to appear to come from specific locations on the screen.

Conferencing software that supports real-time voice communications over a network is becoming very common in today's society. A distinguishing feature between different conferencing software programs is an ability to support spatialized audio, i.e., the ability to hear sounds relative to the location of the listener—the same way one does in the real world. Many non-spatialized audio conferencing software products, such as NetMeeting, manufactured by Microsoft Corp., Redmond, Wash. and Intel Corp., North Bend, Wash.; CoolTalk, manufactured by Netscape Communications Corp., Mountain View, Calif.; and TeleVox, manufactured by Voxware Inc., Princeton, N.J., are rigid. They do not provide distance-based attenuation (i.e., sounds are not heard relative to the distance between persona locations on the TV screen during the conference). Non-spatialized audio conferencing software does not address certain issues necessary for performing communications in computer scenery. Such issues include: (1) efficient means for joining and leaving a conference; and (2) provision for distance attenuation and other mechanisms to provide the illusion of sounds in real space.

Spatialized audio conference software does exist. An example is Traveler, manufactured by OnLive! Technologies, Cupertino, Calif., but such software packages exist mainly to navigate 3D space. Although they attempt to spatialize the audio with reference to human representatives in the scene, a sound's real world behavior is not achieved.

As users navigate through a computer-based scene such as a Virtual Reality Modeling Language (VRML) "world", they should be able to hear (and to broadcast to other users) audio sounds emanating from sources within the scene. Current systems typically do not do a very good job of realistically modeling sounds. As a result, the sounds not are heard relative to the user's current location as in the real world.

What is needed is a system and method for providing audio conferencing that provides realistic sounds that appear to emanate from positions in the scene relative to the location of the user's avatar on the TV screen.

SUMMARY OF THE INVENTION

Briefly stated, the present invention is directed to a system and method for enabling an audio conference server (ACS) to provide an application program with multi-point, weight controllable audio conferencing functions. The present invention achieves realistic sound by providing distance-based attenuation. The present invention associates an energy level with the sound (e.g., weak, medium, strong, etc.) to define the sound within the scene according to the sound's real world behavior.

The ACS manages a plurality of audio conferences, receives audio data from a plurality of audio clients, mixes the audio data to provide distance-based attenuation and decay characteristics of sounds, and delivers the mixed audio data to a plurality of audio clients. Audio clients include set-top box audio clients and point source audio (PSA) audio clients. Set-top box audio clients can be set-top boxes, computer workstations, and/or personal computers (PCs). PSA audio clients include audio files and audio input lines.

The ACS mixes the audio data by identifying a decay factor. Pre-defined decay factors include an audio big decay factor, an audio small decay factor, an audio medium decay factor, and a constant decay factor. One can also develop a customized decay factor. A weighted value for a source audio client based on the identified decay factor and the distance between the source audio client and a target audio client is determined. A mix table is generated using the weighted values for each source/target audio client pair. Then, an actual mix value for each target audio client is calculated using the weighted values from the mix table. The present invention also includes means for refining the actual mix value.

The ACS manages the audio conferences using an ACS shell. The ACS shell is a user interface that provides interactive program access to the ACS using high level methods for creating and managing a proxy audio conference and for creating and managing point source audios. The ACS shell also provides program access to the ACS via low level methods for creating and managing audio conferences.

The ACS also checks the status of a registered owner of each audio conference using a resource audit service (RAS). The RAS informs the ACS when the registered conference owner stops running. Then, the ACS closes the conference.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein:

FIG. 11 is a list of the methods contained in an ACProxy class;

FIG. 12 is a list of the methods contained in a PointSourceAudio class;

FIG. 13 is a list of the methods contained in an AudioConferenceService class;

FIG. 14 is a list of the methods contained in an AudioConference class;

DETAILED DESCRIPTION OF THE PREFERRED EMBODIMENTS

Figure 1:
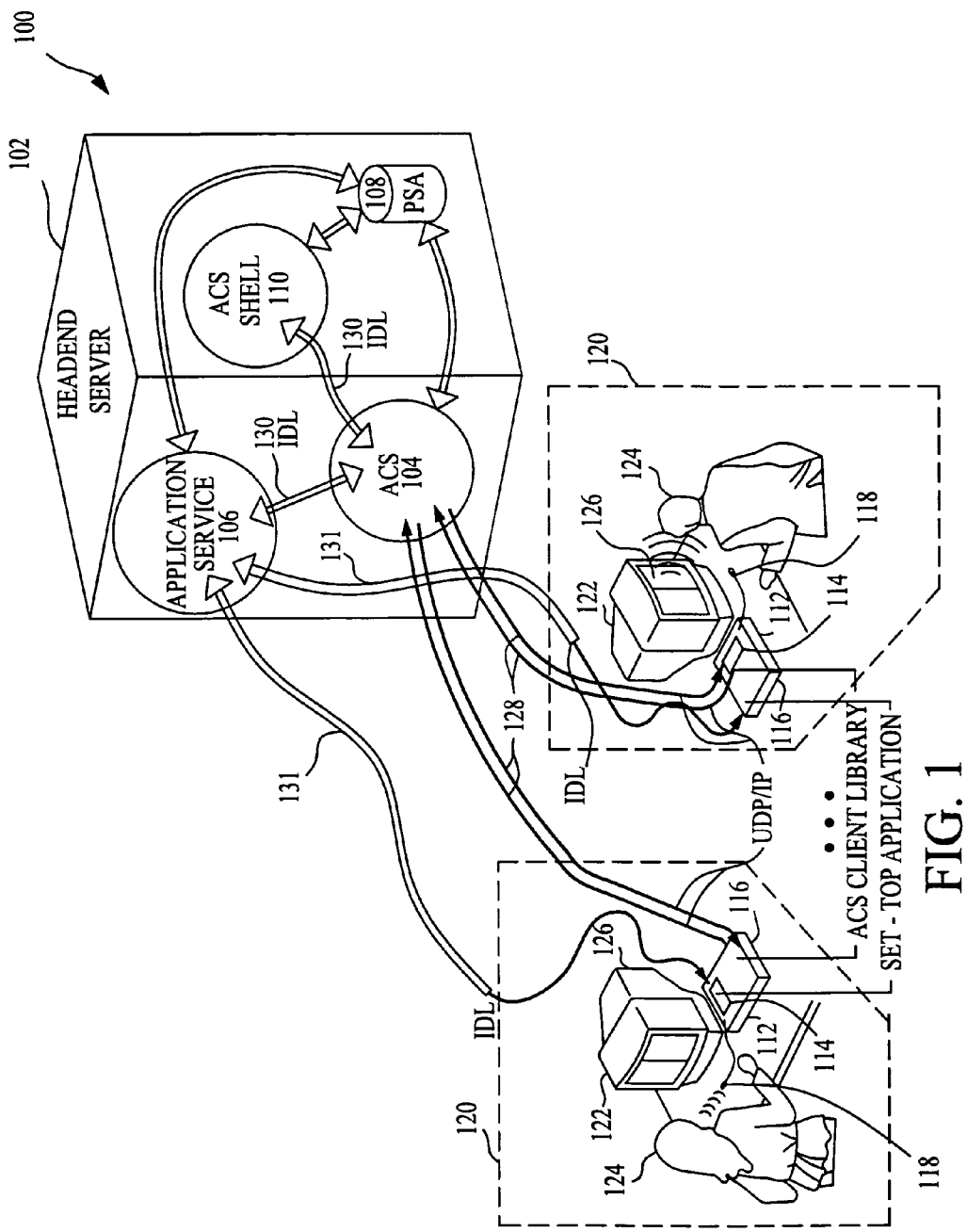
FIG. 1 is a block diagram of an audio conferencing network environment according to a preferred embodiment of the present invention.

The preferred embodiment of the present invention is discussed in detail below. While specific configurations are discussed, it should be understood that this is done for illustration purposes only. A person skilled in the relevant art will recognize that other components and configurations may be used without departing from the spirit and scope of the invention.

Overview of the Invention

The present invention is directed to a system and method for enabling an audio conference server (ACS) to provide multi-point, weight controllable audio conferencing functions to application programs. The present invention allows application programs to incorporate audio conference features without being concerned with the details of audio processing, audio delivery, and audio data mixing. The present invention allows multiple applications to share one conference. Applications can also use a conference created by another application. The present invention allows viewers in an audio conference to hear sounds and talk to other viewers across an interactive TV network.

In an application service that incorporate the ACS, the ACS enables the application service to have audio clients. Audio clients are displayed as points on a TV screen from which sound appears to emanate. Approaching a source of sound makes the sound grow louder. Moving away from the source of sound makes the sound grow fainter. Audio clients can be point sources of sound, referred to as point source audios (PSAs), from audio files or an audio input line. Viewers having conversations with others on a network using a set-top box (STB) microphone and TV speaker are another type of audio client, often referred to as a set-top box (STB) audio client. The STB audio client includes a set-top application for controlling an audio stream of data emanating from the STB microphone or the TV speaker.

The set-top application, application service, and the ACS typically reside on separate systems, thus requiring a network communications' set-up among them. The ACS manages the data exchange and audio mixing among clients and servers. The ACS uses a COBRA (Common Object Request Broker Architecture) Interface Definition Language (IDL) interface for setting up an audio conference, and a User Datagram Protocol/Internet Protocol (UDP/IP) interface for transmitting and receiving audio streams of data. Both COBRA IDL and UDP/IP interfaces are well known to persons skilled in the relevant art(s).

The ACS receives audio streams of data from STB and PSA audio clients, mixes the audio streams of data to enable distance-based attenuation of sounds as well as decay characteristics according to the sound's behavior, and delivers the mixed audio streams to the designated STB audio clients. Audio mixing adjusts the volume of a persona's voice (from a STB) or sound emanating from a PSA relative to the distance between the location of the sound and the audio client's persona on the TV screen: the greater the distance, the fainter the audio. Also, if the sound is a low-energy sound, such as a wind chime, the sound will decay quickly. If the sound is a high energy sound, such as a waterfall, the sound will decay slowly.

A user can interactively interface with the ACS using an ACS shell. The ACS shell, written in TCL (a tool command language developed by John Ousterhout of the University of California, Berkeley), is an IDL-based client that connects to the ACS. The ACS shell enables developers to prototype applications, and operators to monitor and control audio conferences.

FIG. 1 is a block diagram of an exemplary audio conferencing network environment 100 in which the present invention is implemented. The audio conferencing network 100 includes a headend server 102 and a plurality of workstations 120. The workstations 120 are connected to the headend server 102 via a communication bus (not explicitly shown). A typical communication bus architecture includes any one of coaxial, fiber-optic, and 10BaseT cabling, all of which are well known to persons skilled in the relevant art(s).

The headend server 102 houses an audio conference server (ACS) 104, an application service 106, and an ACS shell 110. The headend server 102 may also contain PSAs 108. The application service 106 is an application that incorporates the ACS 104. PSAs 108 can be audio files or analog input lines. The ACS 104 enables the application service 106 to incorporate audio conference features without being concerned with the details of audio processing, audio delivery, and audio data mixing. The ACS shell 110 is an IDL client that connects to the ACS 104 to provide a user interactive interface to monitor and control the full range of ACS functions.

Each workstation 120 contains a set-top box (STB) 112 and a TV 122. The TV 122 includes a TV screen 125 and a speaker 126. The TV screen 125 displays the audio clients (PSAs 108 and/or STBs 112) that are included in the audio conference while the sounds emanating from the displayed audio clients (PSAs 108 and/or STBs 112) are heard by a viewer 124 via the TV speaker 126. The STB 112 contains a set-top application 114, an ACS client library 116, and a microphone 118. The ACS client library 116 contains application program interfaces (APIs) that are exported to the set-top application 114. The APIs enable the set-top application 114 to control an audio stream of data emanating from the microphone 118 or the TV speaker 126. An ACAudioClient class contains the API interface between the set-top application 114 and the ACS client library 116. The ACAudioClient class contains methods that enable set-top applications 114 to join or leave an audio conference, start and stop audio conferencing ability for STB 112 audio clients, and to control and monitor audio talking.

The ACS 104 enables the application server 106 to have audio clients. The functionality of the ACS 104 is two-fold. First, the ACS 104 manages the audio stream of data. For example, audio sounds emanating from each STB 112 are interfaced to the ACS 104 over the communication bus using a UDP/IP interface 128. When a viewer 124 speaks into the microphone 118, the viewer's voice is imported from the microphone 118 to the set-top box 112 in a digitized pulse code modulation (PCM) format. PCM is a digital transmission technique by which a continuous signal is periodically sampled, quantized, and transmitted in digital binary code. PCM is well known to persons skilled in the relevant art(s). (Note that when a viewer is not speaking, silence suppression is provided to avoid flooding the network.) The ACS client library 116 sends the PCM audio data stream as UDP/IP data packets 128 over the communication bus to the ACS 104 in the headend server 102. UDP/IP protocol is used for real-time audio data delivery. The ACS 104 mixes the audio data stream accordingly, and sends the mixed audio data stream to each designated viewer's set-top TV speaker 126 via UDP/IP over the communication bus through the appropriate STBs 112. Each designated viewer hears the sound relative to that viewer's position to the sound on the TV screen 125 according to the real life characteristics of the sound. If the set-top application 114 has turned on the local echo feature, the viewer's voice is also sent locally to the viewer's set-top speaker 126. The echo is in real time; there is no network delay.

Second, the ACS 104 manages the audio conference. Conference management is performed using IDL. The application service 106 communicates with the ACS 104 over the communication bus using an IDL interface 130. The set-top application 114 communicates with the application service 106 over the communication bus using an IDL interface 131. Communications from the set-top application 114 that are relevant to audio conference management are translated by the application service 106 into a conference management command and passed to the ACS 104 via IDL interface 130. The ACS 104 handles IDL requests from the application service 106. The IDL interface 130 comprises software methods that when executed, perform various ACS functions. These methods, when called by the application service 106 are executed transparently. The methods perform such functions as creating and deleting a conference, adding and removing participants to and from the conference, respectively, changing the volume mix balance between participants in the conference, etc. Although IDL is relatively slow, IDL was chosen for its reliability.

Implementation of the Invention

Figure 2:
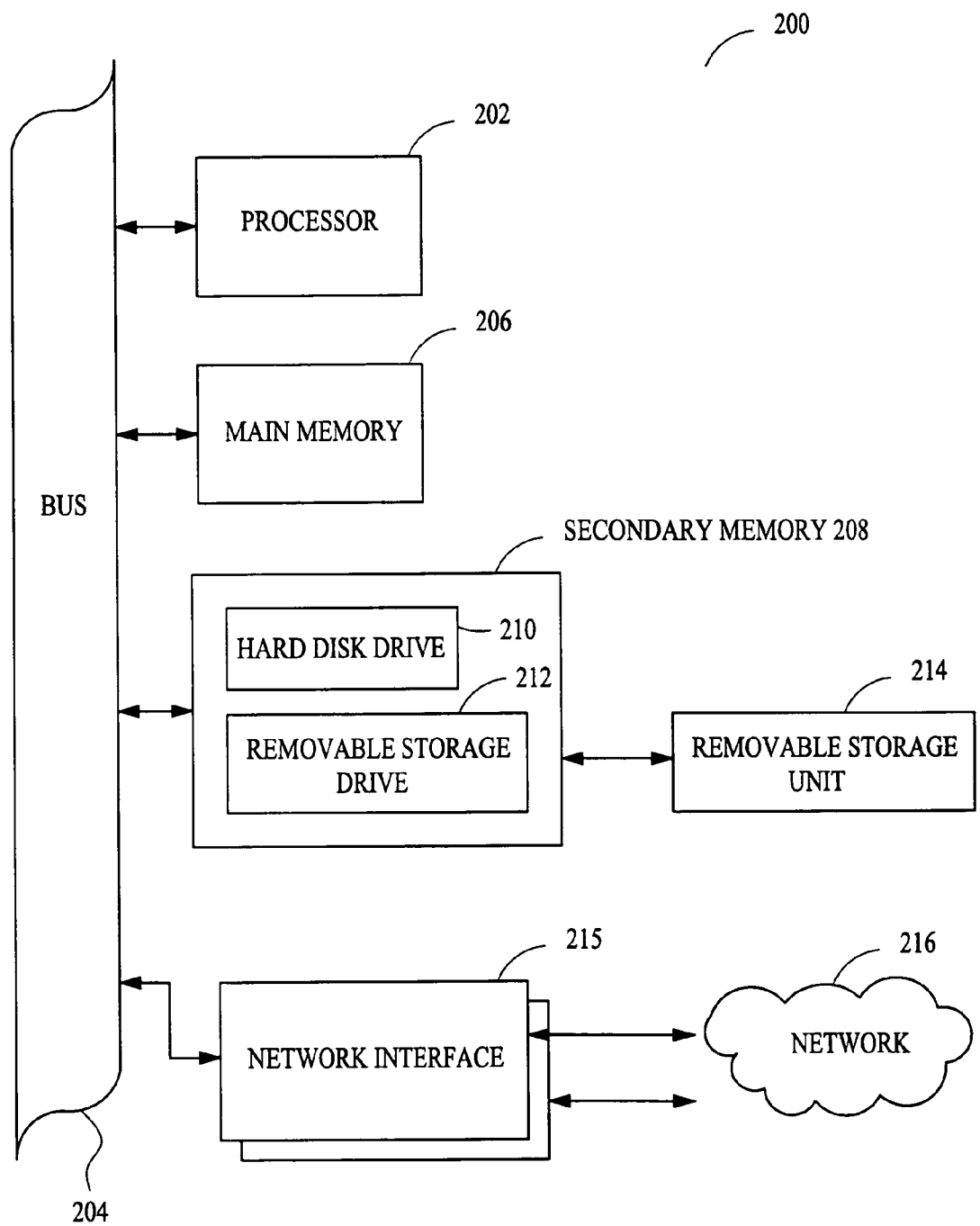
FIG. 2 is a block diagram of a computer system useful for implementing the present invention.

The headend server 102 is preferably implemented using a computer system, such as exemplary computer system 200 shown in FIG. 2. Alternatively, the headend server 102 comprises a plurality of computer systems, each like computer system 200. In an alternate embodiment, the application service 106 and the PSA 108 are implemented using a single computer system, and the ACS 104 is a separate computer system. In another embodiment, the application service 106 is implemented using a single computer system, and the ACS 104 and the PSA 108 are implemented on a separate computer system. Other distributions of the application service 106, the ACS 104, and the PSA 108 among computer systems are within the scope and spirit of the present invention.

The computer system 200 includes one or more processors, such as processor 202. The processor 202 is connected to a communication bus 204. The computer system 200 also includes a main memory 206, preferably random access memory (RAM), and a secondary memory 208. The secondary memory 208 includes, for example, a hard disk drive 210 and/or a removable storage drive 212, representing a floppy disk drive, a magnetic tape drive, a compact disk drive, etc. The removable storage drive 212 reads from and/or writes to a removable storage unit 214 in a well known manner.

Removable storage unit 214, also called a program storage device or a computer program product, represents a floppy disk, magnetic tape, compact disk, etc. The removable storage unit 214 includes a computer usable storage medium having stored therein computer software and/or data, such as an object's methods and data.

The computer system 200 can communicate with other computer systems via network interface 215. The network interface 215 is a network interface circuit card that connects computer system 200 to other computer systems via network 216. The other computer systems can be computer systems such as computer system 200, set-top box audio clients 112, or PCs and/or workstations. The network 216 can be one of fiber optics, coaxial, or 10 BaseT.

Computer programs (also called computer control logic), including object-oriented computer programs, are stored in main memory 206 and/or the secondary memory 208. Such computer programs, when executed, enable the computer system 200 to perform the features of the present invention as discussed herein. In particular, the computer programs, when executed, enable the processor 202 to perform the features of the present invention. Accordingly, such computer programs represent controllers of the computer system 200.

In another embodiment, the invention is directed to a computer program product comprising a computer readable medium having control logic (computer software) stored therein. The control logic, when executed by the processor 202, causes the processor 202 to perform the functions of the invention as described herein.

In yet another embodiment, the invention is implemented primarily in hardware using, for example, one or more state machines. Implementation of these state machines to perform the functions described herein will be apparent to persons skilled in the relevant art(s).

ACS Threads

The ACS 104 is a multi-threaded process having multiple threads, each thread executing a separate audio conference function. The ACS 104 contains a thread for managing audio conferences, a thread for monitoring the system, a thread for keeping track of conference ownership, a thread for receiving audio data from audio clients, and a thread for mixing and delivering audio data.

Figure 3:
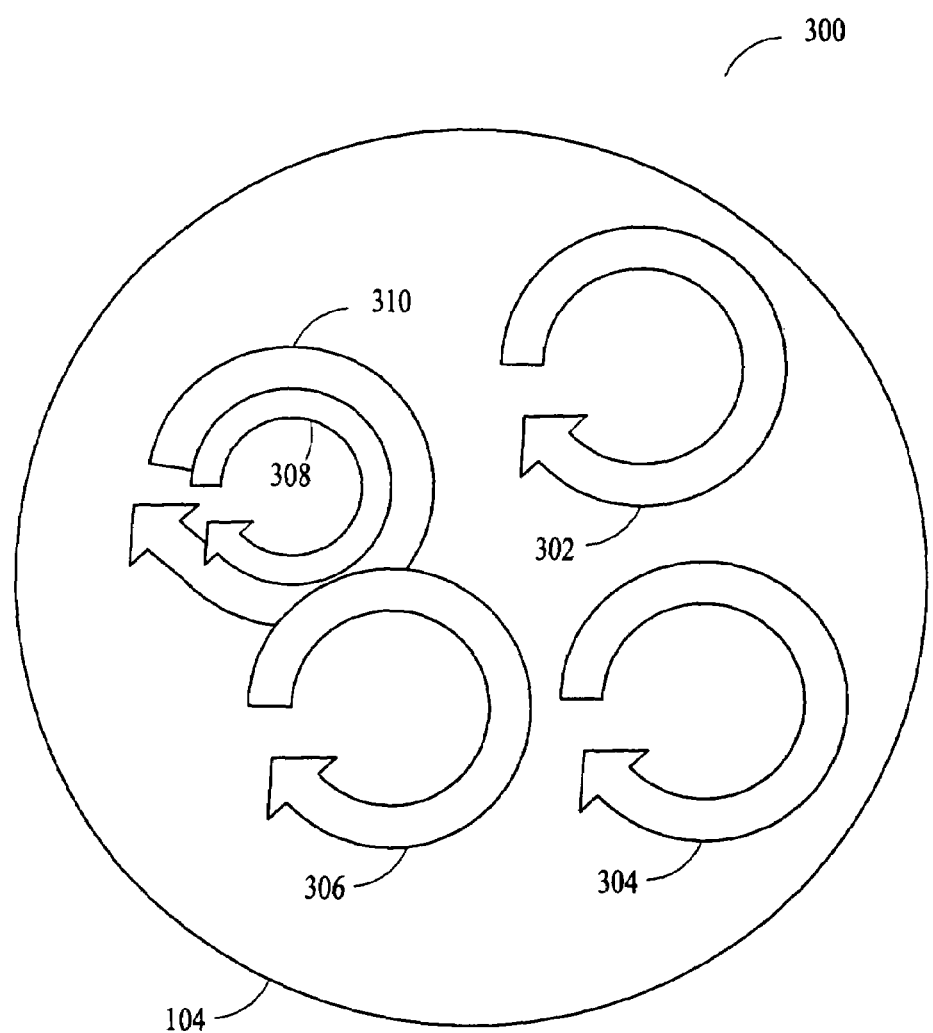
FIG. 3 is a diagram representing the threads involved in audio conferencing for the present invention.

FIG. 3 is a diagram 300 representing the multiple threads of the ACS 104. Upon initialization, the ACS 104 creates three threads. The first thread is a conference manager thread 302 that handles incoming IDL method calls from the application service 106. The second thread is a conference recycler thread 304 that monitors the system and performs appropriate garbage collection. The third thread is a resource audit service (RAS) pinger thread 306 that checks the status of the registered owner of a conference.

Users interactively interface with the ACS 104 via the ACS shell. The ACS shell enables program access to low level IDL methods. The conference manager thread 302 handles all incoming IDL method calls from the application service 106. The low level IDL methods that are handled by the conference manager thread 302 are discussed below (under ACS Shell).

The ACS 104 needs to know if the application that created an audio conference is still running. When the audio conference is generated and used by the same application, the application reports that it is alive by pinging the ACS 104. The conference recycler thread 304 monitors the pinging. When the pinging stops, the conference recycler thread 304 terminates the audio conference.

When the audio conference is generated by one application and used by a different application, the above method of pinging the conference recycler thread 304 is not applicable. For example, a game launcher application generates a conference that is used by a game. To accommodate this situation, the RAS pinger thread 306 is used. The RAS pinger thread 306 is responsible for pinging a resource audit service (RAS) to obtain information about the existence of the registered owner of a conference. Conference ownerships are registered with the RAS via a registered owner interface. Using the RAS pinger thread 306, the RAS informs the ACS 104 when the registered conference owner stops running. The incorporation of the RAS pinger thread 306 enables an application claiming ownership of an audio conference to pass audio conference ownership to another application using the registered owner interface.

Figure 4:
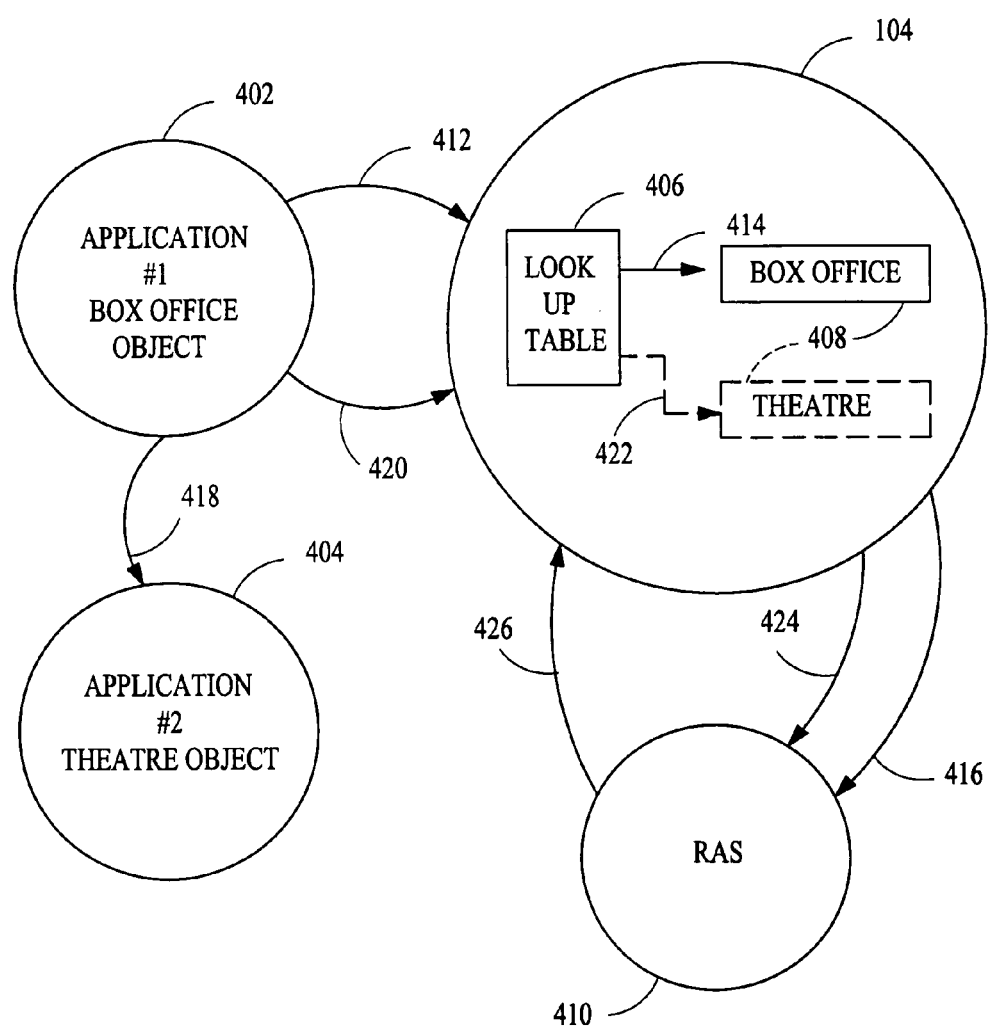
FIG. 4 is an exemplar process of an audio conference service's conference owner thread.

An audio conference ownership transfer will now be discussed with reference to FIGS. 4, 5A and 5B. FIG. 4 is an exemplar process 400 representing a conference ownership transfer using the RAS pinger thread 306. Two applications are shown in FIG. 4. The first application is a box office application 402. The second application is a theatre application 404. The box office application 402 sells tickets to viewers. Since no one can enter the theatre without purchasing a ticket from the box office, the box office application 402 creates the audio conference and registers itself as the owner of the conference with the ACS 104. Once the tickets have all been sold and the attraction is ready to begin, the viewers enter the theatre room. At this time the box office application 402 passes audio conference ownership to the theatre application 404 and registers the theatre application 404 as the owner of the conference with the ACS 104.

The ACS 104 keeps a lookup table 406 in which each audio conference has a matching entry 408. The matching entry 408 is the registered owner of the conference. When the theatre application 404 terminates, the ACS 104 detects the termination and closes the conference.

The RAS 410 keeps track of a registered application. The RAS 410 pings the registered application using IDL and also checks for its existence via the operating system. When the registered application ceases to exist, the RAS 410 notifies the ACS 104. If the application was the registered owner of the conference, then ACS 104 closes the conference and cleans up. In the above example, when the viewers leave the theatre and the theatre application 404 ceases to exist, the RAS 410 reports it to the ACS 104. The ACS 104 looks at the table, sees that the registered owner is gone, and closes the conference.

Figure 5A:
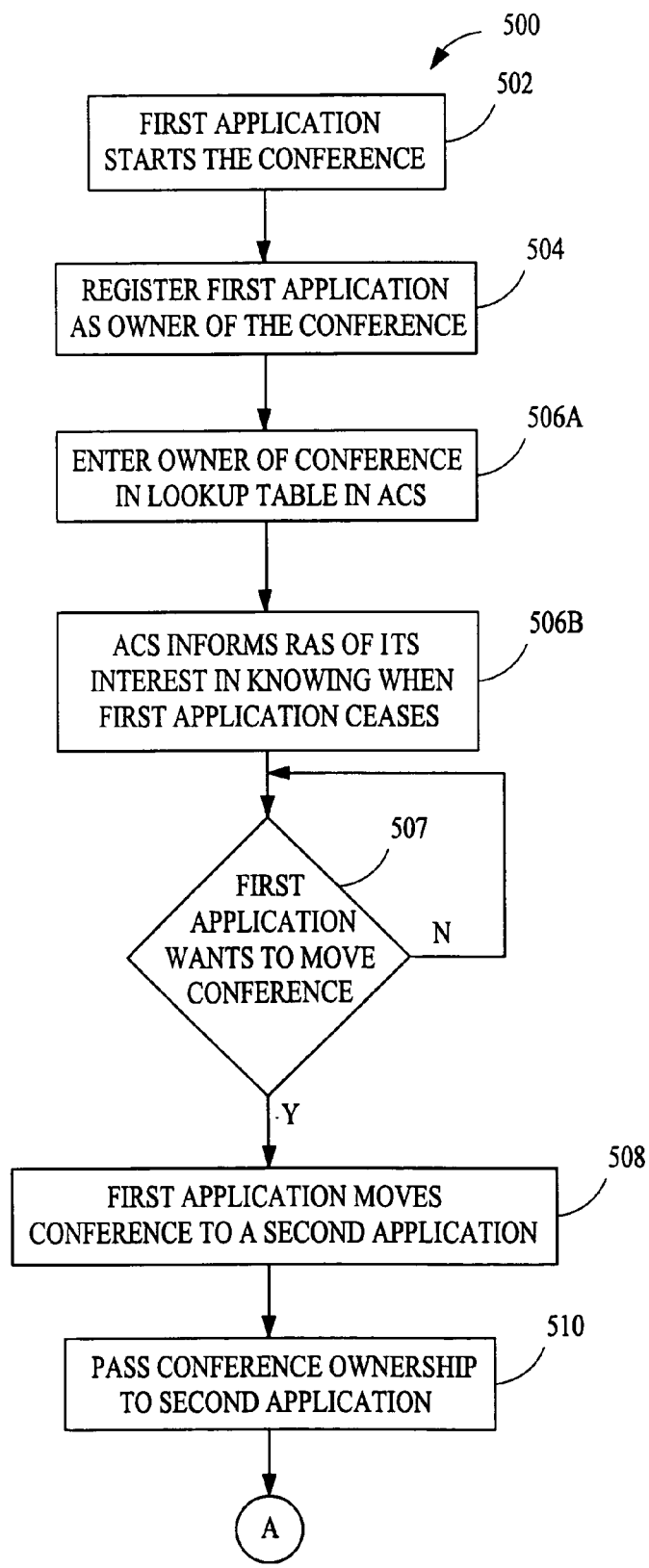
FIGS. 5A and 5B represent a flow diagram of the process of changing a registered owner of an audio conference.
Figure 5B:
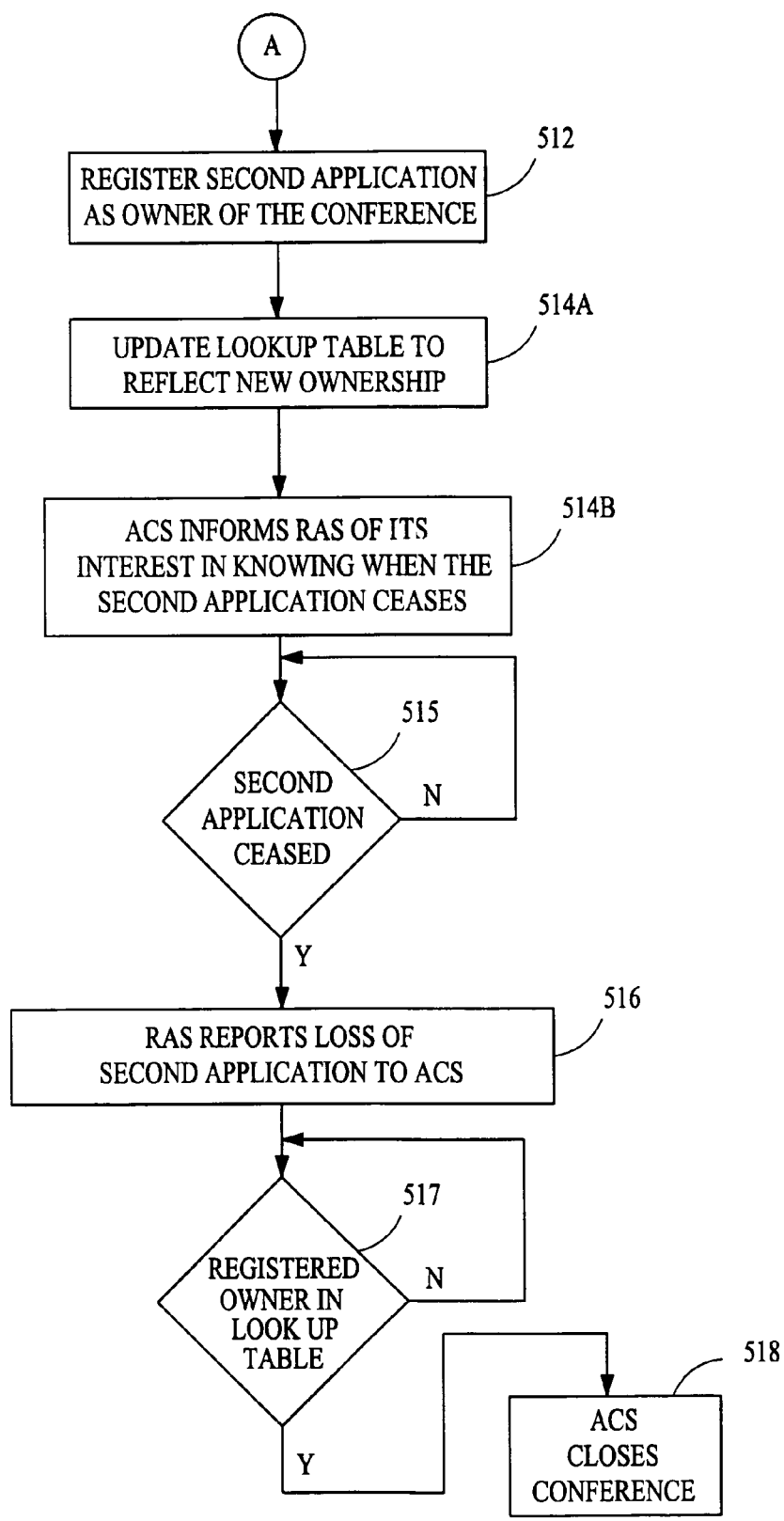

FIGS. 5A and 5B represent a flow diagram 500 of the process of changing a registered owner of a conference. With reference to FIG. 5A, in step 502 a first application starts the conference, and control passes to step 504. In step 504, the owner of the conference is registered with the ACS 104 (shown as arrow 412 in FIG. 4). The ACS 104 enters the owner of the conference in the lookup table 406 in step 506a (shown as arrow 414 in FIG. 4). The ACS 104 then informs the RAS 410 that it is interested in knowing when the first application ceases to exist in step 506b (shown as arrow 416 in FIG. 4). Control then passes to decision step 507.

In decision step 507, it is determined whether the first application wants to move the conference. If the first application does not want to move the conference, control stays with decision step 507. If the first application wants to move the conference, control passes to step 508.

In step 508, the first application moves the conference ownership to a second application (shown as arrow 418 in FIG. 4). Conference ownership in the second application is then passed to the ACS 104 in step 510 (shown as arrow 420 in FIG. 4).

Referring to FIG. 5B, in step 512, the second application is registered as the owner of the conference, and the ACS 104 rewrites the lookup table 406 to reflect the new owner of the conference in step 514a (shown as arrow 422 in FIG. 4). The ACS 104 then informs the RAS 410 that it is interested in knowing when the second application ceases to exist in step 514b (shown as arrow 424 in FIG. 4). Control then passes to decision step 515.

In decision step 515, it is determined whether the second application has ceased. If the second application is still running, control remains in step 515. When the second application ceases, control passes to step 516.

In step 516, the RAS 410 reports the loss of the second application to the ACS 104 (shown as arrow 426 in FIG. 4). Control then passes to decision step 517.

In decision step 517, it is determined whether the second application is registered as the owner of the conference in the lookup table. If the second application is not registered as the owner of the conference in the lookup table, control remains in step 517. If the second application is registered as the owner of the conference in the lookup table, control passes to step 518. In step 518, the ACS 104 closes the conference.

Returning to FIG. 3, when a new conference starts, two new threads are generated in the ACS 104. The first new thread is a net listener thread 308. The net listener thread 308 receives audio data from audio clients 112 via the network. The second new thread is a mixer thread 310. The mixer thread 310 performs actual audio mixing and delivers the mixed audio data to the audio clients 112 through the network. Actual audio mixing will be discussed below.

The net listener thread 308 receives upstream audio data packets that are sent from the STB 112. The net listener thread 308 listens to the network. Whenever STBs 112 send data over the network via UDP/IP 128, the net listener thread 308 gathers the audio data packets and passes them to the mixer thread 310 via a shared buffer (not shown) located between the net listener thread 308 and the mixer thread 310.

Figure 6:
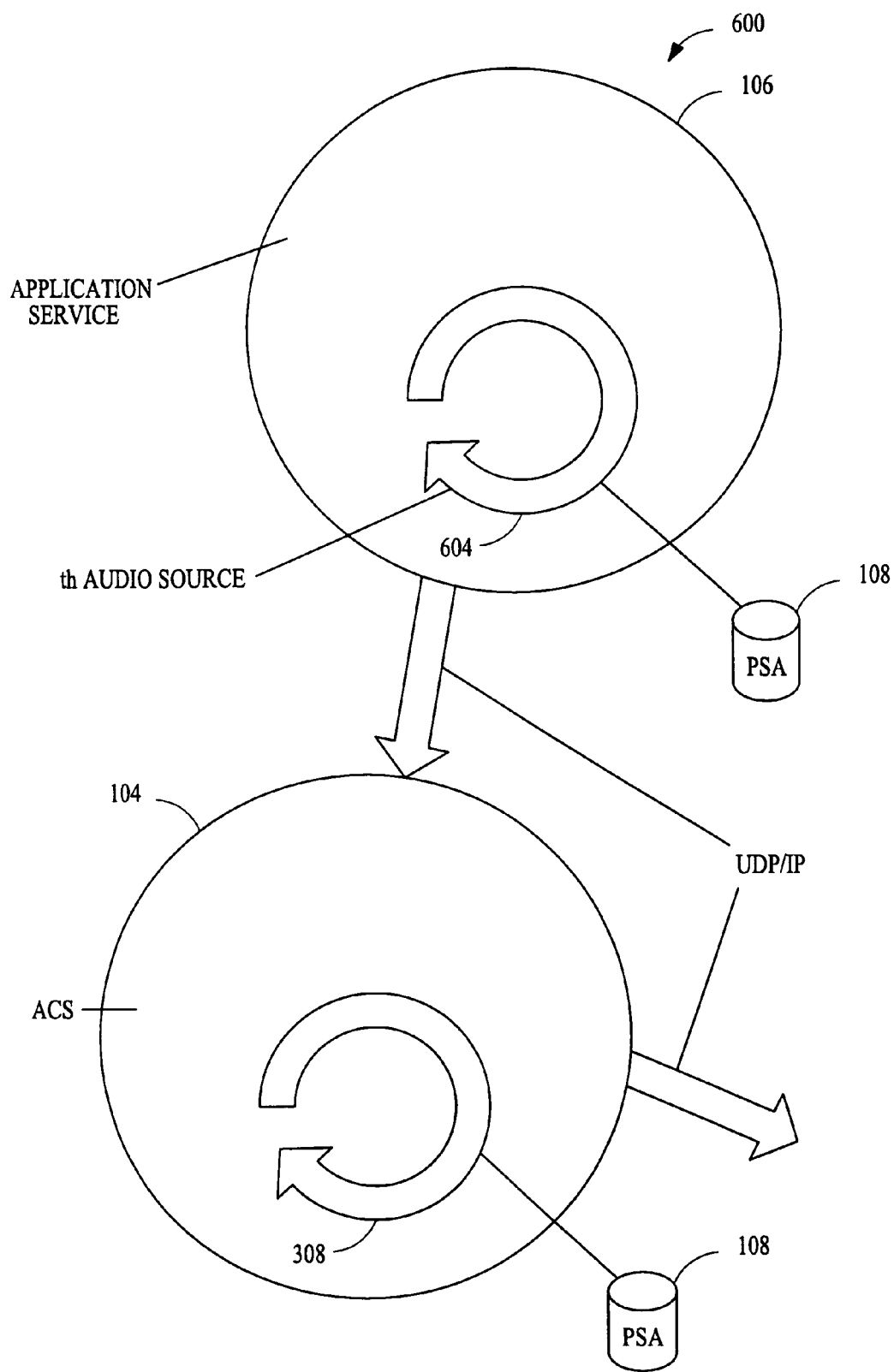
FIG. 6 represents a diagram representing the play back of a PSA.

A PSA can be played from the application service 106 or from within the ACS 104. FIG. 6 is a diagram 600 representing the play back of a PSA 108. When PSAs 108 are played from the application service 106, one thread 604, called thAudioSource, per PSA is generated in the application service 106. The thAudioSource thread 604 gets audio from the file (i.e., PSA 108) and sends it to the ACS 104 via UDP/IP. After the application service 106 sends the PSA 108 to the ACS 104, the process is the same as described for a set-top audio client 112 (i.e., the data is received by the net listener thread 308 and passed to the mixer thread 310 where it is mixed and sent to the designated audio clients 112 over the network via UDP/IP).

As previously stated, an application can play a PSA 108 in the ACS 104. When an application plays the PSA 108 in the ACS 104, the net listener thread 308 directly fetches the audio data from the file (i.e., PSA 108). This reduces the network traffic of the audio stream.

Audio Mixing and Delivery

As previously stated, the mixer thread 310 performs actual audio mixing and delivers the mixed audio data to the audio clients 112 through the network via UDP/IP 128. The present invention provides audio mixing with distance-based attenuation. When an audio client (PSAs 108 or STBs 112) moves closer to another audio client (PSAs 108 or STBs 112), the sound gets louder, and when the audio client (PSAs 108 or STB 112) retreats, the sound gets quieter. A PSA 108 might be, for example, the sound of a snoring dragon. When an audio client represented by a STB 112 moves closer to the dragon, the snoring sounds louder, and when the STB 112 retreats, the snoring sound is quieter.

Figure 7:
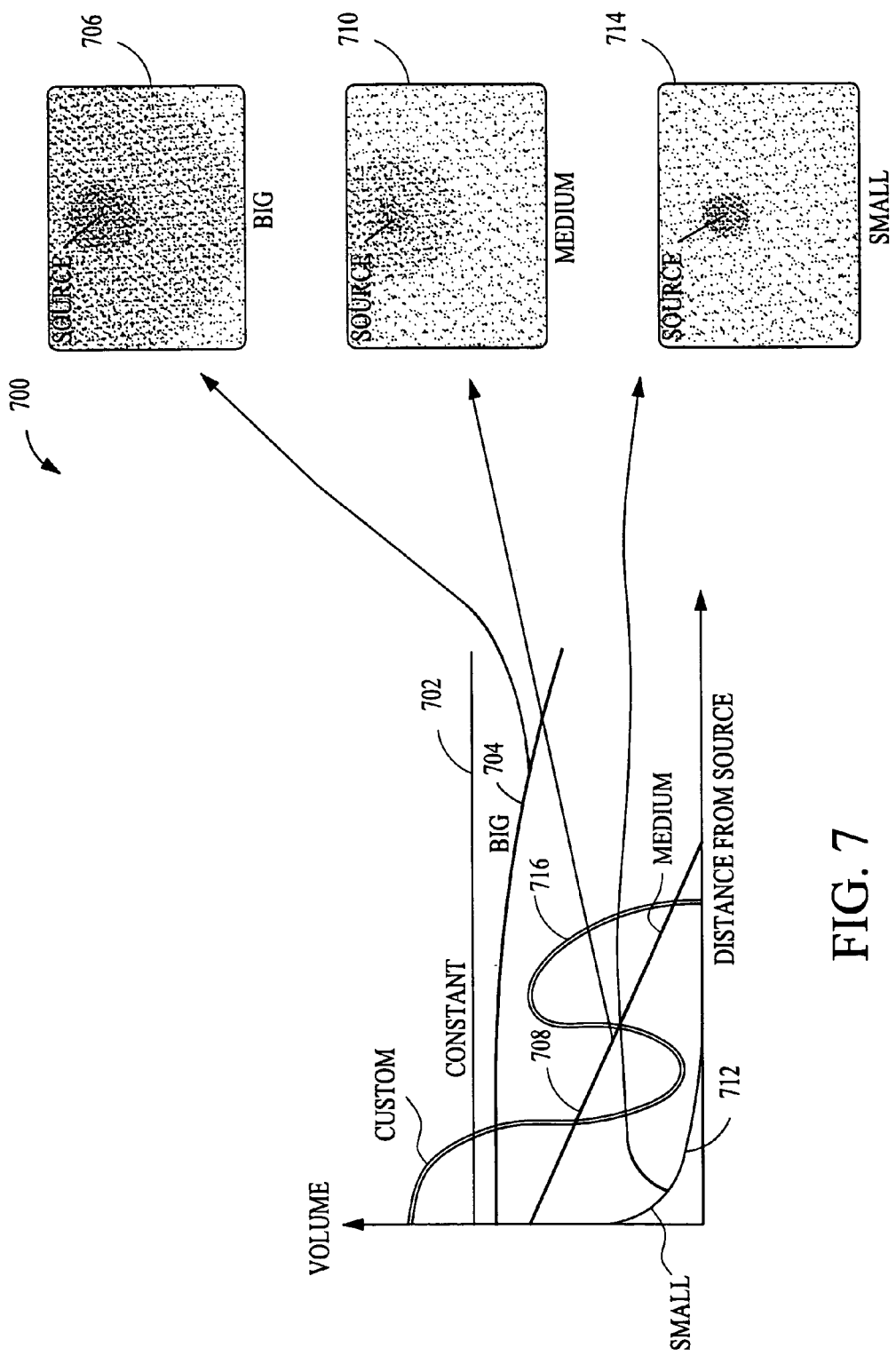
FIG. 7 represents a graph showing pre-defined decay factors for four categories of sounds.

The ACS 104 accomplishes this by implementing decay characteristics for categories of sounds. FIG. 7 represents a graph 700 showing pre-defined decay factors for four categories of sounds. Graph 700 plots volume vs. distance for each pre-defined decay factor.

The first pre-defined decay factor represents a sound of constant volume regardless of distance. This plot is identified as audioConstant 702. AudioConstant sounds are heard at the same volume from anywhere on the TV screen 126. The second predefined decay factor represents a sound of loud volume. This plot is identified as audioBig 704. AudioBig sounds can be heard by an audio client (PSA 108 or STB 112) anywhere on the TV screen 126 (shown on TV screen 706), and even several screens away. The third pre-defined decay factor represents a sound of low volume. This plot is identified as audioSmall 712. AudioSmall sounds can only be heard by audio clients (PSAs 108 and STBs 112) who are near the sound source on the TV screen 126 (shown on TV screen 714). The small sound (audioSmall 712) decays to zero inversely and more quickly than the big sound (audioBig 704). The last pre-defined decay factor represents a medium sound, i.e., a sound that falls between audioBig 704 and audioSmall 712. This plot is identified as audioMedium 708. AudioMedium sounds can be heard on approximately half of the TV screen 126, but not beyond the TV screen 126 (shown on TV screen 710). Medium sounds decay linearly, in between the small and big sounds. Developers can also customize decay factor values. A plot of an exemplary custom decay factor 716 is also shown in graph 700.

Figure 8:
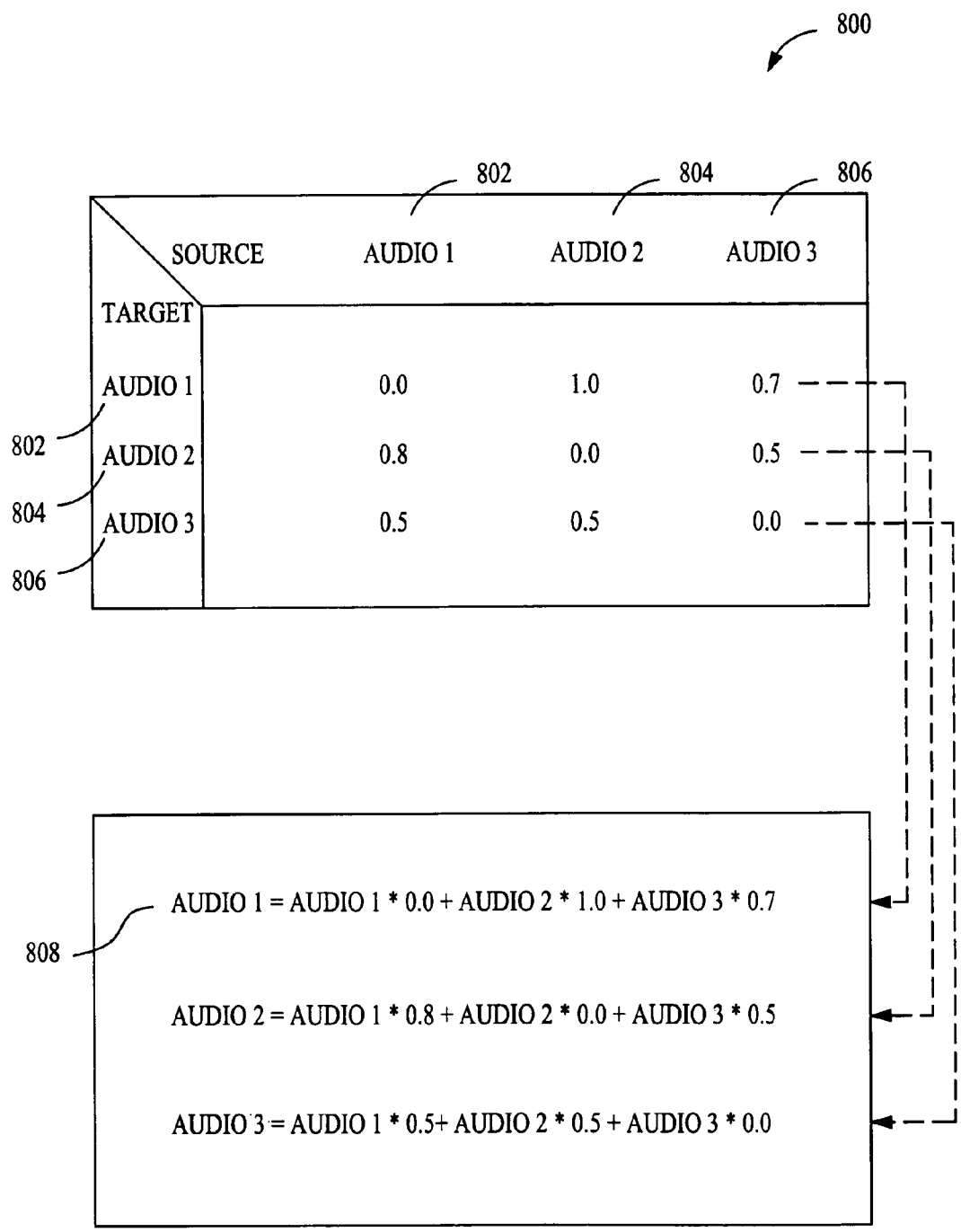
FIG. 8 is an exemplary mix table with audio mix equations for target audio clients.

When audio clients (PSAs 108 and STBs 112) are added to the conference, the application specifies the decay factor for that audio client (PSA 108 or STB 112). As previously stated, audio data received from audio clients (STBs 112) is received via the net listener thread 308. The mixer thread 310 performs the actual audio mixing and delivers the mixed audio data to the audio clients (STBs 112) through the network via UDP/IP 128. The actual audio mixing is accomplished by generating an audio mix table. An exemplary audio mix table 800 is shown in FIG. 8. The mix table 800 contains weighted values for each source audio client (STB 112) in relationship to each target audio client (PSA 108 or STB 112) in the conference. A target audio client (STB 112) is the audio client that is receiving the sound. According to graph 700, the target audio client (STB 112) always resides at location (0,0). A source audio client (PSA 108 or STB 112) is the audio client from which the sound is emanating. Weighted values for each source audio client (STB 112) are extracted from graph 700 according to the distance between the target audio client (STB 112) and the source audio client (PSA 108 or STB 112) using the decay factor specified for the source audio client (PSA 108 or STB 112) when that source audio client (PSA 108 or set-top box 112) was added to the conference. The weighted values range from 0.0 to 1.0, with 0.0 indicating no volume and 1.0 indicating maximum volume.

The mix table 800 shows that the weight of a target audio client (STB 112) to itself is 0.0. Thus the target audio client (STB 112) will not be able to hear its own echo.

The audio mix to be delivered to target audio client audio1 802 is 0.0 for audio client audio1 802, 1.0 for audio client audio2 804, and 0.7 for audio client audio3 806. This indicates that audio client audio1 802 will hear audio client audio2 804 at maximum volume and audio client audio3 806 at 70% of the maximum volume. Equation 808 represents the audio mix for target audio client audio1 802. Equations 810 and 812 represent the audio mix for target audio clients audio2 804 and audio3 806, respectively.

The mixer thread 310 also refines the mixed audio using the following functions: gain control, fading in/fading out, floating point operation elimination, mixing adaption, mixing cut-off and stream audio. The gain control function controls the gain to avoid transmitting excess energy audio data after calculating the weighted sum. The fading in/fading out function avoids the delivery of audio data in a step-wise manner to the speaker output (which results in discontinuity on the user side) by smoothing the audio data on fading in and fading out. The floating point operation elimination function avoids floating point operation by using pre-calculated weight functions instead of performing actual floating point multiplication. The mixing adaption function is used to adapt an actual mix calculation for a source audio client to the available CPU resources. The mixing cut-off function provides better scalability by allowing a mixing cut-off of three, in which the three nearest talking audio clients are selected for the actual mix. The stream audio function prepares stream audio for two purposes: (1) playing ambient background music, such as radio in cyber-space; and (2) using it as an audio source forwarded from another conference. An example of refining an audio mix using both the mixing adaption and mixing cut-off functions follows.

After the mixer thread 310 mixes the audio data, the mixed PCM audio data packet is sent over the network via UDP/IP 128 to the corresponding audio clients (STBs 112). Whether the full active mix for each audio client (STBs 112) is sent depends on the availability of CPU resources. If the CPU resources are busy, the active mix for any one audio client (STB 112) will be reduced. For example, if an audio client's active mix is equivalent to:

$$audioX=0.1 \times audio1+0.3 \times audio2+0.5 \times audio3+0.7 \times audio4+1.0 \times audio5+0.0 \times audioX,$$

and adequate CPU resources were available, the entire active mix could be delivered to audioX. Alternatively, if CPU resources were busy, then the active mix would be reduced. The reduction might be to delete audio1 and audio2 since they are only heard by audioX at 10% and 30% of the maximum volume, respectively.

Figure 9A:
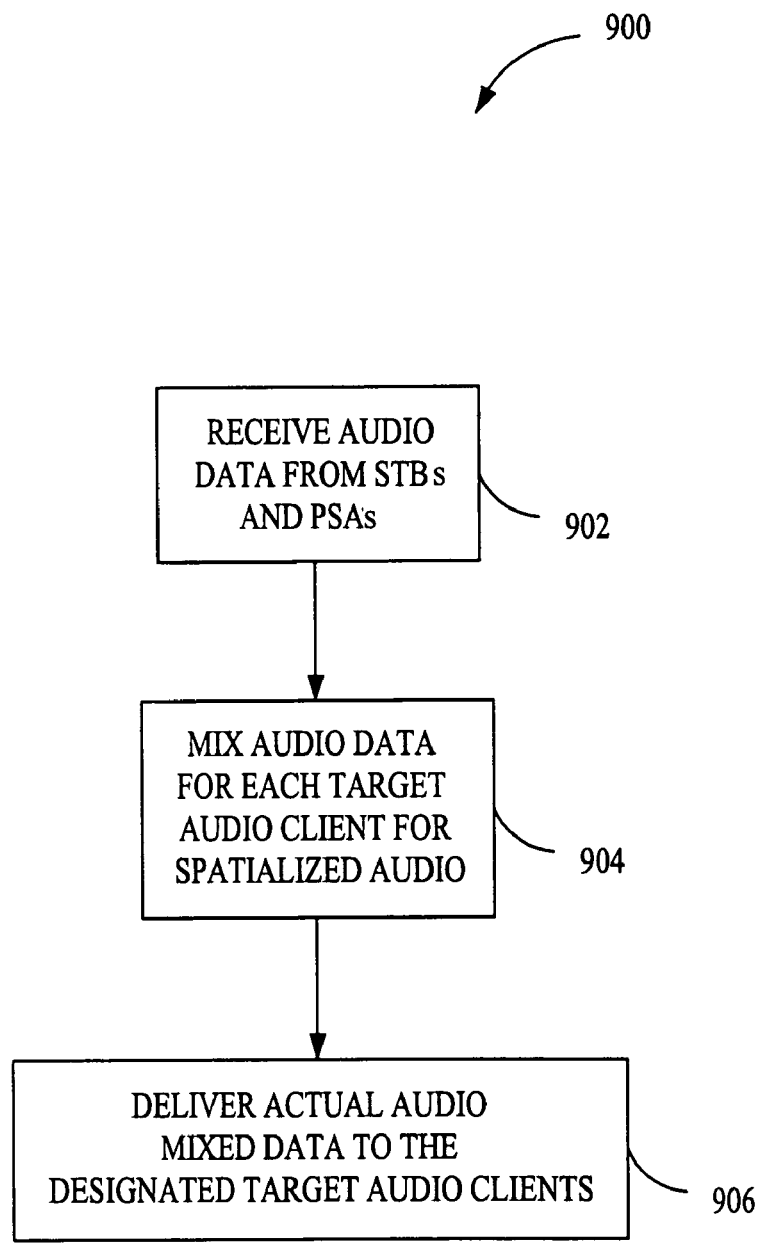
FIG. 9A is a flow diagram representing the functionality of the mixer thread.

FIG. 9A is a flow diagram 900 representing the functionality of the mixer thread 310. Flow diagram 900 begins by receiving audio data from the net listener thread 308 and from PSAs 108 generated in the application service 106 or the ACS 104 in step 902. Control then passes to step 904.

In step 904, audio mixing is performed for each source audio client in the conference to provide spatialized audio. Control then passes to step 906 where delivery of the actual audio mix to the target audio clients (STBs 112) is performed.

Figure 9B:
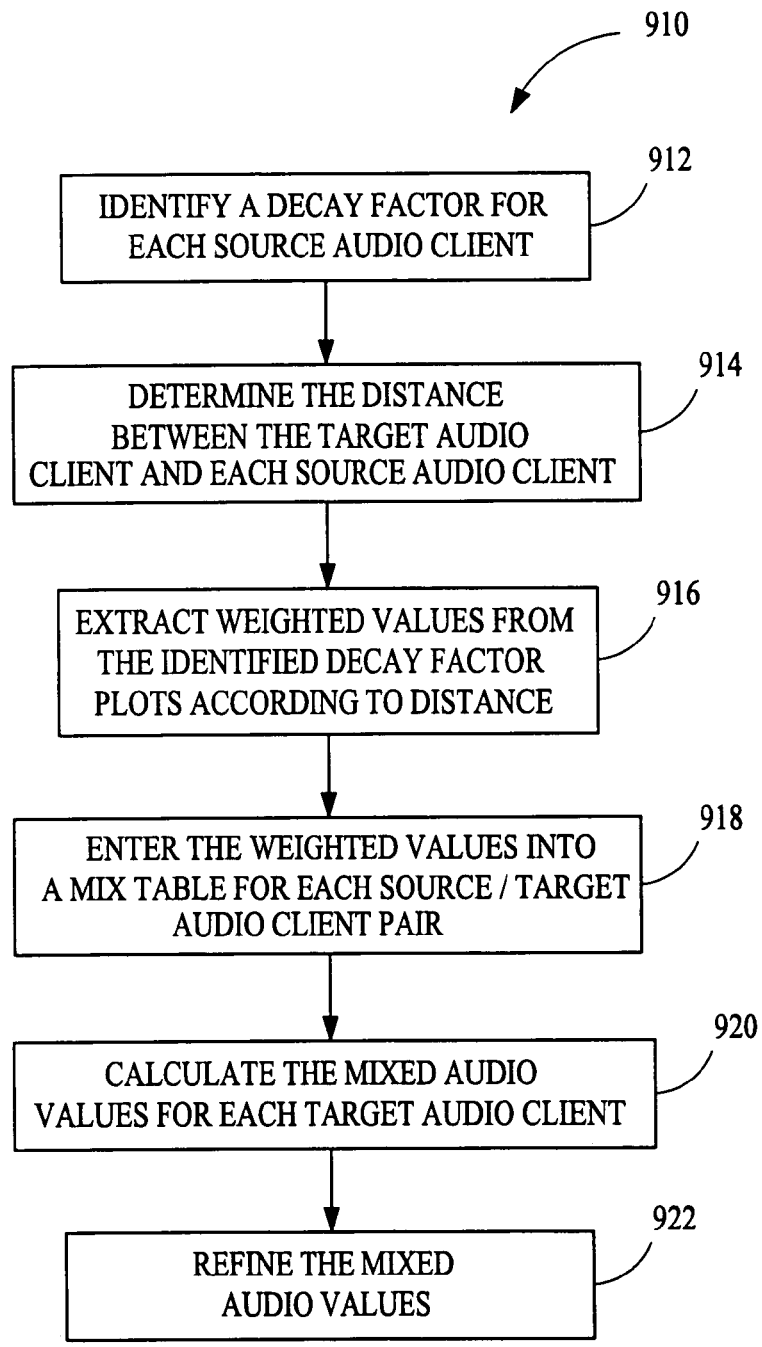
FIG. 9B is a flow diagram representing the audio mixing process.

FIG. 9B is a flow diagram 910 representing the audio mixing process 904. Flow diagram 910 begins by identifying the decay factor for each source audio client in step 912. Control then passes to step 914.

In step 914, the distance between the target audio client and each source audio client is determined. Using the distances determined in step 914, a weighted value is extracted using the identified decay factors from step 912 for each source audio client in step 916. Control then passes to step 918.

In step 918, the weighted values determined in step 916 are entered into a mix table for each source/target audio client pair. The actual mix values are calculated in step 920 for each target audio client. The resultant audio mix values are refined in step 922.

ACS Shell

The ACS shell 110, written in TCL (a tool command language developed by John Ousterhout of the University of California, Berkeley), is an IDL client that connects to the ACS 104 and provides an interactive interface to monitor and control the full range of ACS functions. The ACS shell 110 enables developers to quickly prototype an application and operators to monitor and control audio conferences. The ACS shell 110 provides an ACS shell command prompt for prompting a user to enter ACS shell commands. The ACS shell prompt identifies the shell, time, and history, for example, acsshell <10:09 am>[1]%. ACS shell commands enable the user to examine the execution of and interact with audio conferences and audio clients (PSAs 108 and STBs 112).

Figure 10:
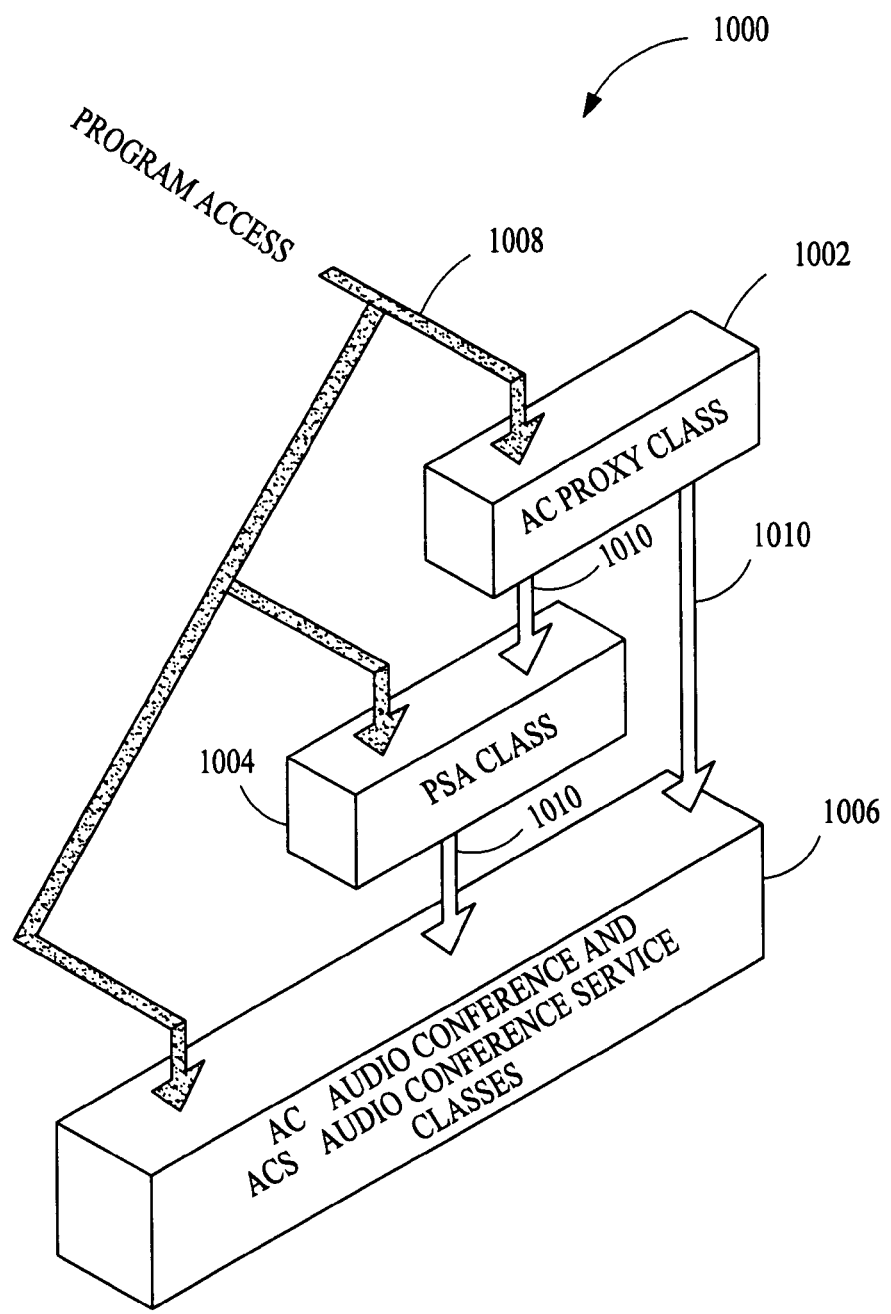
FIG. 10 is a diagram representing program access and internal interfaces to the audio conference classes of the ACS shell.

ACS shell commands that provide audio conferencing functionality are divided into four distinct classes. FIG. 10 is a diagram 1000 representing program access and internal interfaces to the ACS shell audio conferencing classes, as well as the interrelationship among classes. The classes include an ACProxy class 1002, a PSA class 1004, and AudioConference and AudioConferenceService classes 1006.

The easiest way to use the ACS 104 is through the ACProxy class 1002. The ACProxy class provides a higher level of functionality than the lower level AudioConference and AudioConferenceService classes 1006. The ACProxy class 1002 provides most, but not all, of the functionality implemented by the lower level classes 1006. The ACProxy class 1002 also calculates sound relationships (mixed audio) automatically when audio clients change position.

Methods 1100 contained in the ACProxy class 1002 are shown in FIG. 11. The ACProxy methods 1100 enable the creation of a proxy audio conference. There are fourteen (14) methods in the ACProxy class 1002. The methods include:

(1) ACProxy() method 1102
(2) ~ACProxy() method 1104;
(3) AddClient() method 1106;
(4) AddPSA() method 1108;
(5) Audios() method 1110;
(6) DemuteAudio() method 1112;
(7) GetAudioLocation() method 1114;
(8) GetConfInfo() method 1116;
(9) MoveAudio() method 1118;
(10) MuteAudio() method 1120;
(11) RegisterOwner() method 1122;
(12) RegisterOwnerByName() method 1124;
(13) RemoveAudio() method 1126; and
(14) UnregisterOwner() method 1128.

The ACProxy() 1102 and ~ACProxy() 1104 methods allow the opening and closing of a proxy audio conference, respectively. Methods AddClient() 1106 and AddPSA() 1108 add STB 112 and PSA 108 audio clients to the proxy audio conference, respectively. Audio clients (PSAs 108 and STBs 112) are identified using client IDs. The method Audios() 1110 lists the audio client ID numbers of all audio clients (PSAs 108 and STBs 112) in the proxy audio conference. The audio of a PSA 108 is enabled and disabled using methods DemuteAudio() 1112 and MuteAudio() 1120, respectively.

A proxy audio conference registers ownership of the application to the ACS 104. The ACS 104 then pings the RAS 410 to see if the application continues to exist. To transfer conference ownership to another application, methods RegisterOwner() 1122 and RegisterOwnerByName() 1124 are invoked. The RegisterOwner() method 1122 transfers ownership of the proxy audio conference using an object reference. The RegisterOwnerByName() method 1124 transfers ownership of the audio conference using the name of the application. The UnregisterOwner() method 1128 removes the previous ownership of the audio conference.

The ACProxy class 1002 allows one to specify a TV screen location for an audio client (PSA 108 or set-top box 112) and calculates the changes in sound automatically when audio clients (PSAs 108 and STBs 112) move. This is accomplished by invoking the MoveAudio() method 1118. The X, Y coordinate location of an audio client (PSA 108 or STB 112) is displayed when the GetAudioLocation() method 1114 is invoked.

To remove audio clients (PSAs 108 or STBs 112), the RemoveAudio() method 1126 is invoked. Audio conference information is displayed by invoking the GetConfInfo() method 1116.

Figure 15:
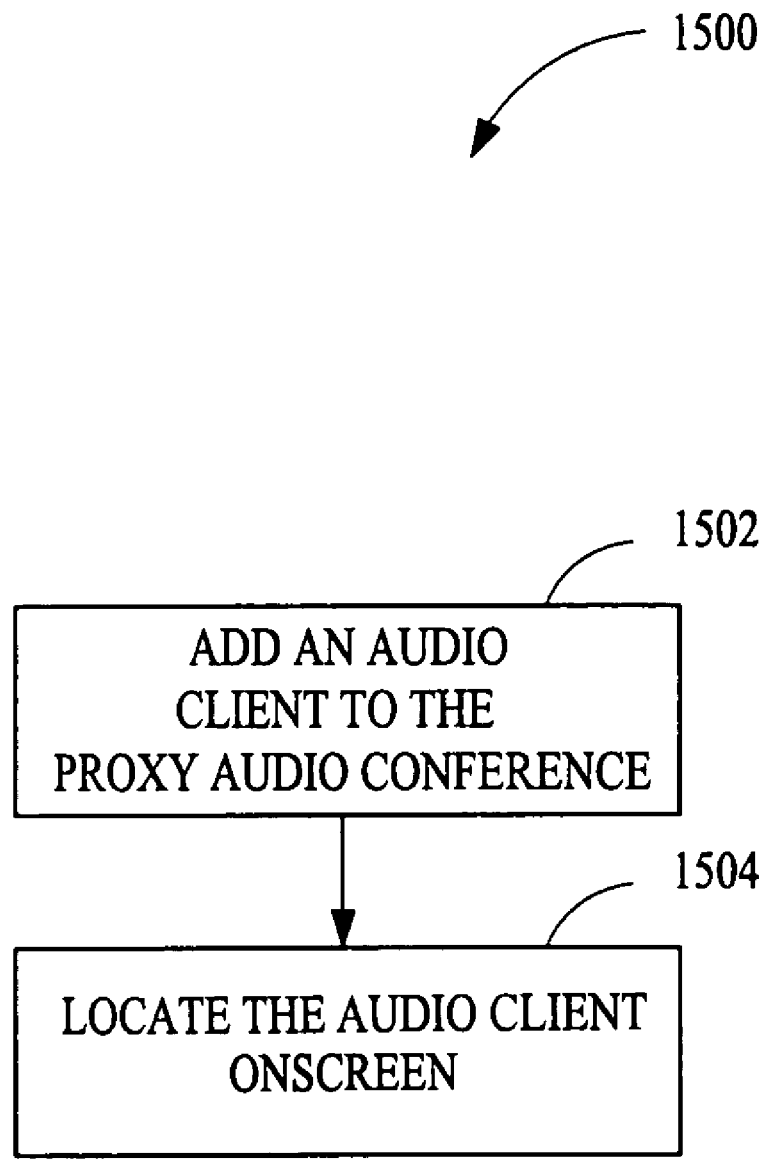
FIG. 15 is a flow diagram representing the addition of an audio client to a proxy audio conference.

An example of how to add audio clients to a proxy conference by invoking methods from the ACProxy class 1002 is shown in FIG. 15. FIG. 15 is a flow diagram 1500 representing the addition of an audio client to a proxy audio conference. Flow diagram 1500 begins by adding an audio client to the proxy audio conference in step 1502. The audio client can be a STB 112 or a PSA 108. If the audio client is a STB 112, the AddClient() method 1106 is invoked. If the audio client is a PSA 108, the AddPSA() method 1108 is invoked. The audio client ID and the decay factor (702, 704, 708, 712, or 716) must be specified in the parenthetical of the AddClient() method 1106 or the AddPSA() method 1108. Control then passes to step 1504.

In step 1504, the audio client is located onscreen by invoking the MoveAudio() method 1118. If the audio client is a STB 112, the character representing the audio client is located onscreen. If the audio client is a PSA 108, the sound source representation of the audio client is located onscreen. When locating an audio client onscreen, the audio client ID and the X, Y coordinates of the audio client must be specified in the parenthetical. The origin, (0,0), is the lower left corner of the TV screen.

Referring back to FIG. 10, the most complete method of using the ACS shell 110 is by accessing the PSA class 1004, and the AudioConference and AudioConferenceService classes 1006 directly. PSAs 108 are initiated by accessing the PSA class 1004. As previously stated, PSAs 108 can be files or audio lines.

The PointSourceAudio class methods 1200 are shown in FIG. 12. These methods allow the user to instance or delete a point source as well as play, pause, stop, and resume play of a point source. The PointSourceAudio class 1004 contains six (6) methods (1202-1212). The six methods include:
(1) PointSourceAudio() method 1202;
(2) ~PointSourceAudio() method 1204;
(3) Play() method 1206;
(4) Stop() method 1208;
(5) Pause() method 1210; and
(6) Resume() method 1212.

The PointSourceAudio() method 1202 instantiates a PSA object. To play the audio source, the Play() method 1206 is invoked. To stop playing the audio source, the Stop() method 1208 is invoked. To resume playing the audio source, the Resume() method 1212 is invoked. The Pause() method 1210 pauses the playing of the audio source. To clean up resources and close the device used by the PSA 108, the ~PointSourceAudio() method 1204 is invoked.

Referring back to FIG. 10, the audio conference methods provided by the AudioConferenceService and AudioConference classes 1006 are direct IDL calls to the ACS 104. Thus, the conference manager thread 302 handles these incoming method calls. The ACProxy class 1002 and the PointSourceAudio class 1004 are wrappers to these IDL interfaces.

The AudioConferenceService methods 1300 are shown in FIG. 13. The AudioConferenceService class 1006 contains five (5) methods (1302-1310). The five (5) methods include:
(1) OpenConference() 1302;
(2) CloseConference() 1304;
(3) GetConferenceByTicket() 1306;
(4) ListConference() 1308; and
(5) HctAudioStat() 1310.

The OpenConference() 1302 and CloseConference() 1304 methods create and close an audio conference. An audio conference is identified by a ticket number. To locate a conference name by ticket number, the GetConferenceByTicket() method 1306 is invoked. One can also obtain a listing of the online conferences by invoking the ListConference() method 1308. Information about STB 112 audio clients can be obtained by invoking the HctAudioStat() method 1310. The data provided for STB 112 audio clients includes such information as:
(1) the host IP address of the ACS 104;
(2) the UDP port on the ACS server that handles the UDP/IP audio data packets;
(3) the port on the set-top side that handles the UDP/IP audio data packets;
(4) the ID of the set-top where this audioID is mapped to;
(5) the number that identifies each audio conference;
(6) the date and time that the audio client (112) was created;
(7) the most recent access of the client or ping;
(8) the most recent time that the ACS 104 received audio data from this audio client (112); and
(9) the most recent time that the ACS 104 sent audio data to this audio client (112).

The methods for the AudioConference class 1400 are shown in FIG. 14. There are sixteen methods in the AudioConference class 1006. They include:
(1) NewAudio() 1402;
(2) DeleteAudio() 1404;
(3) RegisterOwner() 1406;
(4) RegisterOwnerByName() 1408;
(5) UnregisterOwner() 1410;
(6) SetMixOne() 1412;
(7) SetMix() 1414;
(8) GetMxOne() 1416;
(9) GetMix() 1418;
(10) SetTimeOut() 1420;
(11) GetTimeOut() 1422;
(12) AudioIds() 1424;
(13) AudioStat() 1426;
(14) ConfStat() 1428;
(15) HctAudioStat() 1430; and
(16) Ping() 1432.

The methods in the AudioConferenceService and AudioConference class 1300 and 1400, respectively, provide greater control over the audio conference than the ACProxy class methods 1100. As one can see from the lists of methods, one can open and close audio conferences, create and delete audio clients, set an automatic timeout, and set the volume levels between clients.

The RegisterOwner() method 1406, the RegisterOwnerByName() method 1408, and the UnregisterOwner() method 1410 are similar to the ACProxy methods 1122, 1124, and 1128. For descriptions of these methods (1406, 1408, and 1410) refer to the discussion of the ACProxy methods (1122, 1124, and 1128) given above.

Methods NewAudio() 1402 and DeleteAudio() 1404 create an audio client for a given STB 112 and delete an audio client, respectively. The methods SetMixOne() 1412 and GetMixOne() 1416 set the volume and return the volume setting of the conversations between two audio clients (PSAs 108 and STBs 112), respectively. The SetMix() method 1414 and the GetMix() method 1418 set the volume and return the volume setting between many audio client pairs. The SetTimeOut() method 1420 sets a number of seconds of inactivity, after which the conference is closed automatically. A conference can be set to never close, if desired. The GetTimeOut() method 1422 finds the length in seconds of the timeout. The Ping() method 1432 pings a given audio conference and returns an exception if the conference does not exist.

The remaining methods (1424-1430) all deal with providing information about the conference. The AudioIds() method 1424 returns a list of audio IDs in a conference. The AudioStat() method 1426 returns information about an audio client, given the audio ID. The ConfStat() method 1428 returns information about an audio conference, and the HctAudioStat() method 1430 returns information about an audio client, given the STB ID.

Figure 16:
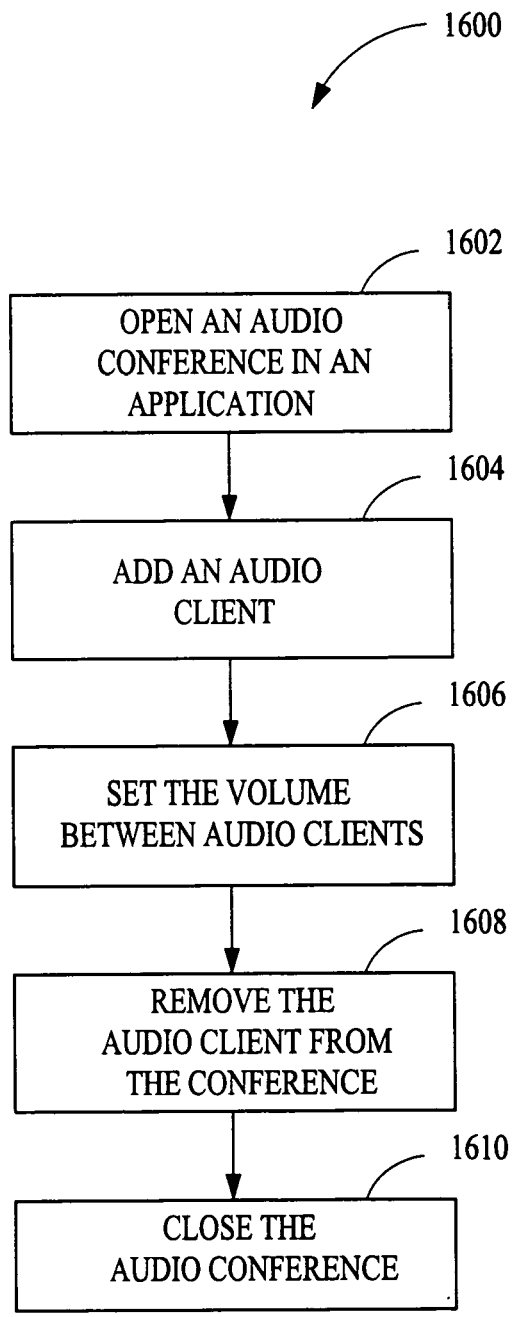
FIG. 16 is an exemplary flow diagram representing an audio conference in a service application using the lower level methods of the AudioConference and AudioConferenceService classes.

FIG. 16 is an exemplary flow diagram 1600 representing an audio conference in a service application using the lower level methods of the AudioConferenceService and AudioConference class 1300 and 1400. The procedural steps in flow diagram 1600 are presented as a guide. Other procedural step distributions for a service application using these lower level methods are within the scope and spirit of the present invention.

Flow diagram 1600 begins in step 1602. In step 1602 an audio conference in an application is opened by invoking the OpenConference() method 1302. The ticket number identifying the audio conference or audio conference ID is returned. Control then passes to step 1604.

In step 1604, a set-top box audio client 112 is added to the conference by invoking the NewAudio() method 1402. The NewAudio() method 1402 returns an audio ID representative of the set-top box 112. Additional audio clients can be created by invoking the NewAudio() method 1402 or the PointSourceAudio() method 1202. Control then passes to step 1606.

In step 1606, the volume between audio clients is set by invoking the SetMixOne() method 1412. The audio ID of both the receiver and the sender, as well as the mix (i.e., the weighted factor) must be included in the parenthetical of the SetMixOne() method 1412. If one needed to set up the relative volumes between many viewers, the SetMix() method 1414 would be invoked. The SetMix() method 1414 combines multiple IDL calls into one call. Control then passes to step 1608.

In step 1608, the audio client is removed by invoking the DeleteAudio() method 1404. To delete an audio client, the audio ID of the audio client to be deleted must be specified in the parenthetical of the DeleteAudio() method 1404. Control then passes to step 1610, where the audio conference in the application is closed by invoking the CloseConference() method 1304.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An audio conference server comprising:
one or more processors coupled to a memory comprising instructions executable by the processors, the one or more processors operable when executing the instructions to:
manage at least one audio conference among a plurality of audio clients;
receive real-time audio data from the plurality of audio clients;
mix the real-time audio data and stored audio data associated with at least one point source into spatialized audio data; and
deliver the spatialized audio data to one or more of the plurality of audio clients;
wherein the one or more processors mix the real-time audio data and stored audio data by:
providing distance-based attenuation according to a plurality of predetermined sound decay functions, each sound decay function being associated with a respective one of the plurality of audio clients or the at least one point source, and a respective volume/distance relationship; and
excluding from the spatialized audio data, real-time audio data or stored audio data that, if attenuated, occurs below a predetermined volume value.

2. The audio conference server of claim 1, wherein the processors are further operable to check a status of a registered owner of the at least one audio conference to determine whether the at least one audio conference still exists.

3. The audio conference server of claim 2, further comprising a resource audit service, the resource audit service operable when the at least one audio conference is generated by a first application and is being used by a second application.

4. The audio conference server of claim 1, wherein the plurality of audio clients includes set-top box audio clients.

5. An audio conference server comprising:
managing means operable to manage at least one audio conference among a plurality of audio clients;
receiving means operable to receive audio data from the plurality of audio clients;
mixing means operable to mix the audio data into spatialized audio data; and
delivery means operable to deliver the spatialized audio data to the plurality of audio clients;
wherein the mixing means includes attenuation means operable to provide distance-based attenuation according to a plurality of predetermined sound decay functions, each sound decay function being associated with a respective audio client and a respective volume/distance relationship;
wherein the managing means comprises an audio conference server shell operable to allow a user to interactively interface with the audio conference server, the audio conference server shell including:
means for providing program access to high level methods for creating and managing a proxy audio conference;
means for excluding from the spatialized audio data, real-time audio data or stored audio data that, if attenuated, occurs below a predetermined volume value,
means for providing program access to methods for creating and managing a plurality of point source audio clients; and
means for providing program access to low level methods for creating and managing said at least one audio conference.

6. An audio conference server comprising:
managing means operable to manage at least one audio conference among a plurality of audio clients;
receiving means operable to receive real-time audio data from the plurality of audio clients;
mixing means operable to mix the real-time audio data and stored audio data associated with at least one point source into spatialized audio data; and
delivery means operable to deliver the spatialized audio data to one or more of the plurality of audio clients;
wherein the mixing means includes:
means for identifying a decay function from one of a plurality of pre-defined decay functions and a customized decay function for each of the plurality of audio clients and the at least one point source, the plurality of pre-defined decay functions including an audio big decay function, an audio small decay function, an audio medium decay function, and a constant decay function;
means for determining respective distances between each of the plurality of audio clients and from each of the plurality of audio clients to the at least one point source;
means for determining a weighted value for each of the plurality of audio clients and the at least one point source based on the identified decay function and the respective distances between each of the plurality of audio clients and from each of the plurality of audio clients to the at least one point source;
means for:
generating a mix table including each of the plurality of audio clients and the at least one point source;
calculating an actual mix for the plurality of audio clients using the mix table; and
excluding from the actual mix, real-time audio data or stored audio data that occurs below a predetermined volume value in the mix table; and
refining the actual mix for the plurality of audio clients.

7. An audio conference server comprising:
managing means operable to manage at least one audio conference among a plurality of audio clients;
receiving means operable to receive audio data from the plurality of audio clients;
mixing means operable to mix the audio data into spatialized audio data; and delivery means operable to deliver the spatialized audio data to the plurality of audio clients;
wherein the mixing means includes:
means for identifying a decay function from one of a plurality of pre-defined decay functions and a customized decay function for each of the plurality of audio clients, the plurality of pre-defined decay functions including an audio big decay function, an audio small decay function, an audio medium decay function, and a constant decay function;
means for determining distances between a target audio client and a plurality of source audio clients;
means for determining a plurality of weighted values for each of the source audio clients based on the identified decay function and the distance between each of the source audio clients and the target audio client, wherein each of the weighted values corresponds to a source/target audio client pair;
means for generating a mix table for each of the source/target audio client pairs;
means for calculating an actual mix for the target audio clients; and
means for refining the actual mix for the target audio clients;
wherein the refining means comprises:
a gain control function operable to avoid transmitting excess energy audio data;
a fade in/fade out function operable to avoid the delivery of the audio data in a step-wise manner to a speaker output;
a floating point operation elimination function operable to avoid the performance of floating point multiplication;
a mixing adaption function operable to adapt the actual mix calculation for the target audio client to available CPU resources;
a mixing cut-off function operable to select the nearest talking audio clients for the actual mix; and
a stream audio function operable to prepare stream audio for playing ambient background music or using an audio source forwarded from another conference.

8. A method for enabling an audio conference server to provide an application program with multi-point, weight controllable audio conferencing, comprising:
managing at least one audio conference among a plurality of audio clients;
receiving real-time audio data from the plurality of audio clients;
mixing the real-time audio data and stored audio data associated with at least one point source to yield spatialized audio data; and
delivering the spatialized audio data to one or more of the plurality of audio clients;
wherein mixing the audio data to yield spatialized audio data comprises:
providing distance-based attenuation according to a plurality of predetermined sound decay functions, each sound decay function being associated with a respective one of the plurality of audio clients or the at least one point source, and a respective volume/distance relationship; and
excluding from the spatialized audio data, real-time audio data or stored audio data that, if attenuated, occurs below a predetermined volume value.

9. The method of claim 8, further comprising checking a status of a registered owner of the at least one audio conference to determine whether the at least one audio conference still exists.

10. The method of claim 9, wherein checking comprises activating a resource audit service when the at least one audio conference is generated by a first application and is being used by a second application.

11. The method of claim 8, wherein the plurality of audio clients includes set-top box audio clients.

12. The method of claim 8, wherein managing the at least one audio conference comprises providing program access to high level methods for creating and managing a proxy audio conference using an audio conference server shell.

13. The method of claim 8, wherein managing the at least one audio conference comprises providing program access to methods for creating and managing the point source audio using an audio conference server shell.

14. The method of claim 8, wherein managing the at least one audio conference comprises providing program access to low level methods for creating and managing the at least one audio conference using an audio conference server shell.

15. A method for enabling an audio conference server to provide an application program with multi-point, weight controllable audio conferencing, comprising:
managing at least one audio conference among a plurality of audio clients;
receiving real-time audio data from the plurality of audio clients;
mixing the real-time audio data and stored audio data associated with at least one point source to yield spatialized audio data; and
delivering the spatialized audio data to one or more of the plurality of audio clients;
wherein mixing the audio data to yield spatialized audio data comprises:
identifying a decay function from one of a plurality of pre-defined decay functions and a customized decay function for each of the plurality of audio clients and the at least one point source, the plurality of pre-defined decay functions including an audio big decay function, an audio small decay function, an audio medium decay function, and a constant decay function;
determining respective distances between each of the plurality of audio clients and from each of the plurality of audio clients to the at least one point source;
determining a weighted value for each of the plurality of audio clients and the at least one point source based on the identified decay function and the respective distances between each of the plurality of audio clients and from each of the plurality of audio clients to the at least one point source;
generating a mix table including each of the plurality of audio clients and the at least one point source;
calculating an actual mix for the plurality of audio clients using the mix table;
excluding from the actual mix, real-time audio data or stored audio data that occurs below a predetermined volume value in the mix table; and
refining the actual mix for the plurality of audio clients.

16. A computer program product comprising a computer readable storage medium having computer program logic recorded thereon for enabling an audio conference server to provide an application program with multi-point, weight controllable audio conferencing, the application program operable to: computer program logic comprising:
manage at least one audio conference among a plurality of audio clients;
receive real-time audio data from the plurality of audio clients;

mix the real-time audio data and stored audio data associated with at least one point source into spatialized audio data; and deliver the spatialized audio data to one or more of the plurality of audio clients;

wherein the application program is operable to mix the real-time audio data and stored audio data by: mixing means includes providing distance-based attenuation according to a plurality of predetermined sound decay functions, each sound decay function being associated with a respective one of the plurality of audio clients or the at least one point source, and a respective volume/distance relationship; and excluding from the spatialized audio data, real-time audio data or stored audio data that, if attenuated, occurs below a predetermined volume value.

17. The computer program product of claim 16, wherein the application program is further operable to check a status of a registered owner of the at least one audio conference to determine whether the at least one audio conference still exists.

18. The computer program product of claim 17, further comprising a resource audit service, the resource audit service operable when the at least one audio conference is generated by a first application and is being used by a second application.

19. The computer program product of claim 16, wherein the plurality of audio clients includes set-top box audio clients.

20. The computer program product of claim 16, wherein the application program further comprises an audio conference server shell to allow a user to interactively interface with the audio conference server, the audio conference server shell operable to:

provide program access to high level methods for creating and managing a proxy audio conference;

provide program access to methods for creating and managing a plurality of point sources or audio clients; and provide program access to low level methods for creating and managing the at least one audio conference.

21. A computer program product comprising a computer readable storage medium having computer program logic recorded thereon for enabling an audio conference server to provide an application program with multi-point, weight controllable audio conferencing, the computer program logic comprising:

managing means operable to enable the computer to manage at least one audio conference among a plurality of audio clients;

receiving means operable to enable the computer to receive real-time audio data from the plurality of audio clients;

mixing means operable to enable the computer to mix the real-time audio data and stored audio data associated with at least one point source to yield spatialized audio data; and delivery means operable to enable the computer to deliver the spatialized audio data to one or more of the plurality of audio clients; wherein the mixing means includes: means for enabling the computer to identify a decay function from one of a plurality of pre-defined decay functions and a customized decay function for each of the plurality of audio clients and the at least one point source, the plurality of pre-defined decay functions including an audio big decay function, an audio small decay function, an audio medium decay function, and a constant decay function;

means for enabling the computer to determine respective distances between each of the plurality of audio clients and from each of the plurality of audio clients to the at least one point source;

means for enabling the computer to determine a weighted value for each of the plurality of audio clients and the at least one point source based on the identified decay function and the respective distances between each of the plurality of audio clients and from each of the plurality of audio clients to the at least one point source;

means for enabling the computer to generate a mix table including each of the plurality of audio clients and the at least one point source;

means for enabling the computer to calculate an actual mix for the plurality of audio clients;

means for excluding from the actual mix, real-time audio data or stored audio data that occurs below a predetermined volume value in the mix table; and means for enabling the computer to refine the actual mix for the plurality of audio clients.

22. A computer program product comprising a computer readable storage medium having computer program logic recorded thereon for enabling an audio conference server to provide an application program with multi-point, weight controllable audio conferencing, the computer program logic comprising:

managing means operable to enable the computer to manage at least one audio conference among a plurality of audio clients;

receiving means operable to enable the computer to receive audio data from the plurality of audio clients;

mixing means operable to enable the computer to mix the audio data to yield spatialized audio data; and delivery means operable to enable the computer to deliver the spatialized audio data to the plurality of audio clients;

wherein the mixing means includes: means for enabling the computer to identify a decay function from one of a plurality of pre-defined decay functions and a customized decay function for each of the plurality of audio clients, the plurality of pre-defined decay functions including an audio big decay function, an audio small decay function, an audio medium decay function, and a constant decay function;

means for enabling the computer to determine distances between a target audio client and a plurality of source audio clients;

means for enabling the computer to determine a plurality of weighted values for each of the source audio clients based on the identified decay function and the distance between the source audio client and target audio client, wherein each of the weighted values corresponds to a source/target audio client pair;

means for enabling the computer to generate a mix table for each of the source/target audio client pairs;

means for enabling the computer to calculate an actual mix for the source audio clients; and means for enabling the computer to refine the actual mix for the source audio clients;

wherein the means for enabling the computer to refine the actual mix for the source audio clients comprises:

means for enabling the computer to provide a gain control function to avoid transmitting excess energy audio data;

means for enabling the computer to provide a fade in/fade out function to avoid the delivery of the audio data in a step-wise manner to a speaker output;

means for enabling the computer to provide a floating point operation elimination function to avoid the performance of floating point multiplication;

means for enabling the computer to provide a mixing adaption function to adapt the actual mix calculation for the target audio client to available CPU resources;

means for enabling the computer to provide a mixing cut-off function to select the nearest talking audio clients for the actual mix; and means for enabling the computer to provide a stream audio function to prepare stream audio for playing ambient background music or using an audio source forwarded from another conference.

23. An audio conference server comprising:

a management module operable to manage at least one audio conference among a plurality of audio clients;

a receiver operable to receive real-time audio data from the plurality of audio clients;

a mixer operable to mix the real-time audio data and stored audio data associated with at least one point source into spatialized audio data; and a delivery module operable to deliver the spatialized audio data to one or more of the plurality of audio clients;

wherein the mixer includes an attenuation module operable to provide distance-based attenuation according to a plurality of predetermined sound decay functions, each sound decay function being associated with a respective one of the plurality of audio clients or the at least one point source, and a respective volume/distance relationship; and a selection module operable to exclude from the spatialized audio data, real-time audio data or stored audio data that, if attenuated, occurs below a predetermined volume value.

24. An audio conference server comprising:

a management module operable to manage at least one audio conference among a plurality of audio clients;

a receiver operable to receive real-time audio data from the plurality of audio clients;

a mixer operable to mix the real-time audio data and stored audio data associated with at least one point source to yield spatialized audio data; and a delivery module operable to deliver the spatialized audio data to one or more of the plurality of audio clients;

wherein the mixer includes:

an identification module operable to identify a decay function from one of a plurality of pre-defined decay functions and a customized decay function for each of the plurality of audio clients and the at least one point source, the plurality of pre-defined decay functions including an audio big decay function, an audio small decay function, an audio medium decay function, and a constant decay function;

a distance determining module operable to determine respective distances between each of the plurality of audio clients and from each of the plurality of audio clients to the at least one point source;

a weighted value determining module operable to determine a weighted value for each of the plurality of audio clients and the at least one point source based on the identified decay function and the respective distances between each of the plurality of audio clients and from each of the plurality of audio clients to the at least one point source;

a mix table generator operable to generate a mix table including each of the plurality of audio clients and the at least one point source;

a calculator operable to calculate an actual mix for the plurality of audio clients and the at least one point source;

a selector operable to exclude from the actual mix, real-time audio data or stored audio data that occurs below a predetermined volume value in the mix table; and a refining module operable to refine the actual mix for the plurality of audio clients and the at least one point source.

25. A computer executable code embedded in a computer readable storage medium executable by a processor for an audio conference server providing multi-point, weight controllable audio conferencing, the code comprising:

a managing section operable to enable management of at least one audio conference among a plurality of audio clients;

a receiving section operable to enable reception of real-time audio data from the plurality of audio clients;

a mixing section operable to enable mixing of the real-time audio data and stored audio data associated with at least one point source into spatialized audio data; and a delivery section operable to enable delivery of the spatialized audio data to one or more of the plurality of audio clients;

wherein the mixing section includes: includes an attenuation section operable to provide distance-based attenuation according to a plurality of predetermined sound decay functions, each sound decay function being associated with a respective one of the plurality of audio clients or the at least one point source, and a respective volume/distance; and a selection section operable to exclude from the spatialized audio data, real- time audio data or stored audio data that, if attenuated, occurs below a predetermined volume value.

26. A computer executable code embedded in a computer readable storage medium executable by a processor for an audio conference server providing multi-point, weight controllable audio conferencing, the code comprising:

a managing section operable to enable management of at least one audio conference among a plurality of audio clients;

a receiving section operable to enable reception of real-time audio data from the plurality of audio clients;

a mixing section operable to enable mixing of the real-time audio data and stored audio data associated with at least one point source into spatialized audio data; and a delivery section operable to enable delivery of the spatialized audio data to one or more of the plurality of audio clients;

wherein the mixing section includes:

an identification section operable to enable identification of a decay function from one of a plurality of pre-defined decay functions and a customized decay function for each of the plurality of audio clients and the at least one point source, the plurality of pre-defined decay functions including an audio big decay function, an audio small decay function, an audio medium decay function, and a constant decay function;

a distance determining section operable to enable determination of respective distances between each of the plurality of audio clients and from each of the plurality of audio clients to the at least one point source;

a weighted value section operable to enable determination of a weighted value for each of the plurality of audio clients and the at least one point source based on the identified decay function and the respective distances between each of the plurality of audio clients and from each of the plurality of audio clients to the at least one point source;

a mix table section operable to enable generation of a mix table including each of the plurality of audio clients and the at least one point source;

a calculation section operable to enable refinement of the actual mix for the plurality of audio clients and the at least one point source;

a selection section operable to enable exclusion from the actual mix of real-time audio data or stored audio data that occurs below a predetermined volume value in the mix table; and a refining section operable to enable refinement of the actual mix for the plurality of audio clients and the at least one point source.

27. The audio conference server of claim 1, wherein at least a portion of the stored audio data is associated with one or more of the plurality of audio clients.

28. The audio conference server of claim 1, wherein each of the one or more audio clients is respectively separated from a target audio client by a distance; and the one or more processors mix the real-time audio data and stored audio data by including in the spatialized audio data, the real-time audio data associated with a predetermined number of audio clients that are closest to the target audio client and excluding from the spatialized audio data, the real-time audio associated with any audio clients in excess of the predetermined number.

\* \* \* \* \*